US012574335B2

(12) United States Patent
Tao et al.

(10) Patent No.: US 12,574,335 B2
(45) Date of Patent: Mar. 10, 2026

(54) PFC STORM DETECTION AND PROCESSING METHOD

(71) Applicant: HUAWEI TECHNOLOGIES CO., LTD., Guangdong (CN)

(72) Inventors: Peiying Tao, Nanjing (CN); Yu Wang, Nanjing (CN); Heyang Liu, Nanjing (CN); Hewen Zheng, Nanjing (CN); Jinfeng Yan, Nanjing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 322 days.

(21) Appl. No.: 18/510,315

(22) Filed: Nov. 15, 2023

(65) Prior Publication Data

US 2024/0089213 A1      Mar. 14, 2024

Related U.S. Application Data

(63) Continuation of application No. PCT/CN2021/140389, filed on Dec. 22, 2021.

(30) Foreign Application Priority Data

May 25, 2021      (CN) .......................... 202110572357.7

(51) Int. Cl.
 *H04L 47/6275*      (2022.01)
 *H04L 47/56*      (2022.01)

(52) U.S. Cl.
 CPC ........ *H04L 47/6275* (2013.01); *H04L 47/566* (2013.01)

(58) Field of Classification Search
 CPC ... H04L 47/6275; H04L 47/566; H04L 43/16; H04L 47/10; H04L 47/12; H04L 49/1515;
 (Continued)

(56) References Cited

U.S. PATENT DOCUMENTS

2007/0109970 A1*  5/2007  Galimberti .............. H04L 47/10
                                                                    370/235
2008/0259798 A1*  10/2008  Loh ....................... H04L 45/302
                                                                    370/235
(Continued)

FOREIGN PATENT DOCUMENTS

CN          109412964 A        3/2019
CN          112968811 A        6/2021

OTHER PUBLICATIONS

IEEE Std 802.1Qbb™—2011, "IEEE Standard for Local and metropolitan area networks—Media Access Control (MAC) Bridges and Virtual Bridged Local Area Networks—Amendment 17: Priority-based Flow Control," Sep. 30, 2011, 40 pages.

(Continued)

*Primary Examiner* — Mohamed A Kamara
(74) *Attorney, Agent, or Firm* — Fish & Richardson P.C.

(57)          ABSTRACT

The present disclosure relates to priority flow control (PFC) storm detection and processing methods. In one example method, a first network node performs PFC detection on a first port queue of a first port, and determines that a first preset condition is met. The first preset condition includes: detection is performed in N consecutive first time segments, when the detection is performed in each first time segment, a quantity of first PFC frames sent by the first port queue to a second network node is greater than a first threshold, and a quantity of one or more data packets received by the first port queue from the second network node is less than a second threshold. The first PFC frame is used to indicate the second network node to suspend sending all data flows in the first port queue, and N is a positive integer.

20 Claims, 12 Drawing Sheets

Network architecture 100

(58) Field of Classification Search
CPC ....... H04L 49/35; H04L 47/11; H04L 47/122;
H04L 47/29; H04L 49/1569; H04L
49/3018; H04L 49/506
See application file for complete search history.

(56)                    References Cited

U.S. PATENT DOCUMENTS

2021/0136000 A1*    5/2021   Sun ......................... H04L 47/54
2021/0409506 A1*   12/2021   Radi ................... H04L 47/6215

OTHER PUBLICATIONS

IEEE Std 802.1AB™—2005, "IEEE Standard for Local and met-
ropolitan area networks; Station and Media Access Control Con-
nectivity Discovery," May 6, 2005, 172 pages.
International Search Report and Written Opinion in International
Appln. No. PCT/CN2021/140389, mailed on Mar. 17, 2022, 19
pages (with English translation).
Gao et al., "When Cloud Storage Meets RDMA," Proceedings of
18th USENIX Symposium on Networked Systems Design and
Implementation (NSDI 21), Apr. 12, 2021, 15 pages.
Guo et al., "RDMA over Commodity Ethernet at Scale," Proceed-
ings of ACM SIGCOMM 2016 Conference, Aug. 22, 2016, pp.
202-215.
Extended European Search Report in European Appln No. 21942820.
8, dated Jul. 16, 2024, 11 pages.

* cited by examiner

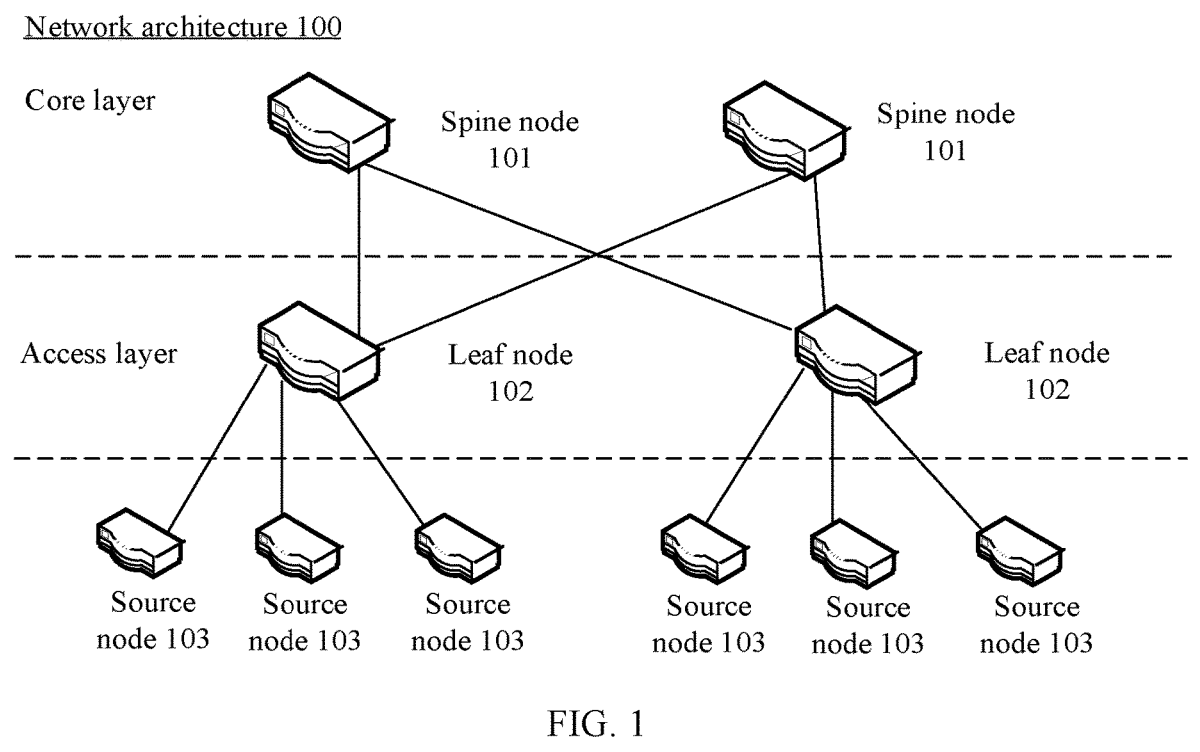

Network architecture 100

Core layer

Spine node
101

Spine node
101

Access layer

Leaf node
102

Leaf node
102

Source
node 103

Source
node 103

Source
node 103

Source
node 103

Source
node 103

Source
node 103

FIG. 1

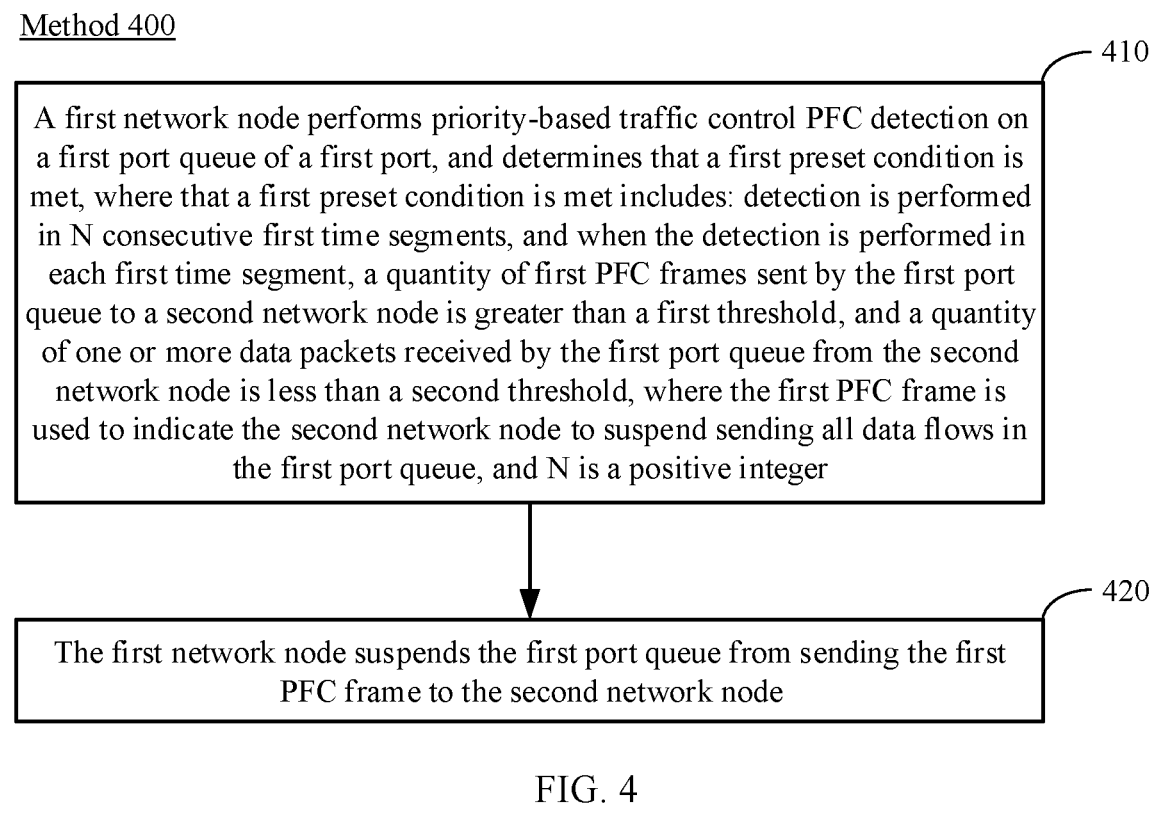

Method 400

410

A first network node performs priority-based traffic control PFC detection on a first port queue of a first port, and determines that a first preset condition is met, where that a first preset condition is met includes: detection is performed in N consecutive first time segments, and when the detection is performed in each first time segment, a quantity of first PFC frames sent by the first port queue to a second network node is greater than a first threshold, and a quantity of one or more data packets received by the first port queue from the second network node is less than a second threshold, where the first PFC frame is used to indicate the second network node to suspend sending all data flows in the first port queue, and N is a positive integer

420

The first network node suspends the first port queue from sending the first PFC frame to the second network node

FIG. 4

| Destination address (6 octets) (destination address) |
| --- |
| Source address (6 octets) (source address) |
| Ethertype (6 octets) (ethertype) |
| Control opcode (2 octets) (control opcode) |
| Priority enable vector (2 octets) (priority enable vector) |
| Time (0) (2 octets) (time (0)) |

(First octet)     (Second octet)

| 0 | E(7), ..., and E(1) |
| --- | --- |

⋮

| Time (7) (2 octets) (time (7)) |
| --- |
| Pad (26 octets) (pad) |
| Cyclic redundancy check (4 octets) (cyclic redundancy check) |

Method 700

Method 800

810

In response to that a second preset condition is met, a first network node adjusts, from a first priority to a second priority, a priority of a second data flow that flows in from a second port queue of a third port and flows out from a second port queue of a second port, so that the second data flow after the adjustment flows in from a third port queue of the third port and flows out from a third port queue of the second port, where a destination node of the second data flow is a second network node, the second port is a port connected to the second network node, the third port queue is a port queue corresponding to the second data flow having the second priority, the second port and the third port are not a same port, a quantity of PFC frames sent by the third port queue of the third port in a fourth time segment is less than a fourth threshold, and a quantity of PFC frames received by the third port queue of the second port in a third time segment is less than a third threshold

820

The first network node sends a first notification message to the second network node, where the first notification message is used to indicate the second network node to enable a PFC function of a port queue that receives the second data flow having the second priority

FIG. 8

| Ethernet header | Internet protocol header | User datagram protocol header | Base transport header | Payload (16 bytes) | Cyclic redundancy check | Frame check sequence |
|---|---|---|---|---|---|---|

| Byte \ Bit | 31-24 | | | | 23-16 | | 15-8 | 7-0 |
|---|---|---|---|---|---|---|---|---|
| 0-3 | Operation code | | | | SE | M | Pad | TVer | Key partition | |
| 4-7 | F | B | Reserved field Resv6 | | Identifier of a target queue | | | |
| 8-11 | A | Reserved field Resv7 | | | Packet number | | | |

FIG. 9

| TLV type | TLV name | Usage |
|---|---|---|
| 0 | Identifier indicating an end of a link layer discovery protocol | Mandatory |
| 1 | Classification identifier | Mandatory |
| 2 | Port identifier | Mandatory |
| 3 | Time to live | Mandatory |
| 4 | Port description | Optional |
| 5 | System name | Optional |
| 6 | System description | Optional |
| 7 | System capability | Mandatory |
| 8 | Management address | Optional |
| 9-126 | Reserved | |
| 127 | System description | Optional |

FIG. 10

| TLV type | Length | Organizationally unique identifier (organizationally unique identifier) | Organizationally defined subtype (organizationally defined subtype) | Organizationally transmitted information (organizationally defined informations string) |
|---|---|---|---|---|
| 7 bits (127) | 9 bits | 24 bits | 8 bits | 0-507 bytes |

FIG. 11

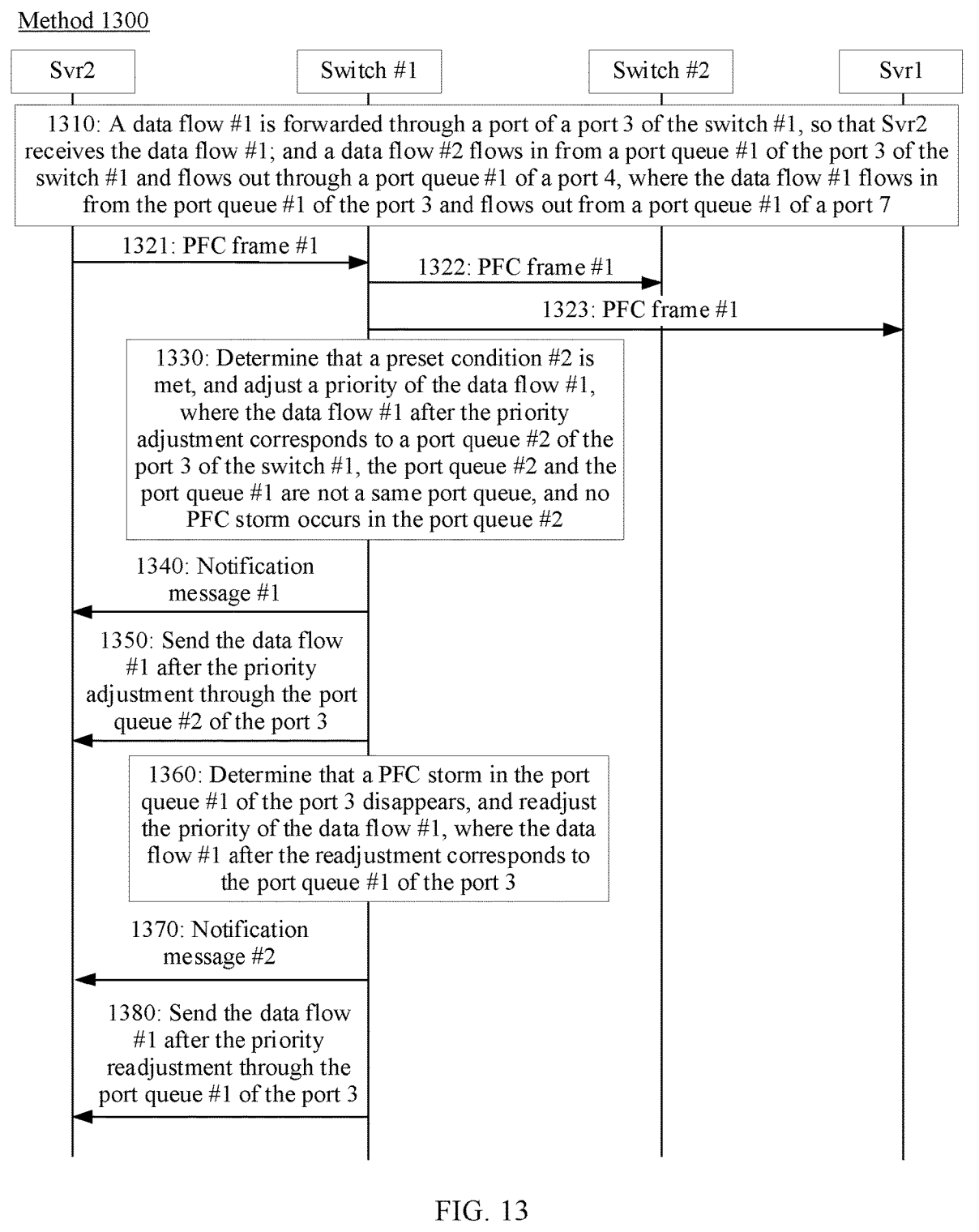

Method 1300

| Svr2 | Switch #1 | Switch #2 | Svr1 |
|------|-----------|-----------|------|

1310: A data flow #1 is forwarded through a port of a port 3 of the switch #1, so that Svr2 receives the data flow #1; and a data flow #2 flows in from a port queue #1 of the port 3 of the switch #1 and flows out through a port queue #1 of a port 4, where the data flow #1 flows in from the port queue #1 of the port 3 and flows out from a port queue #1 of a port 7

1321: PFC frame #1

1322: PFC frame #1

1323: PFC frame #1

1330: Determine that a preset condition #2 is met, and adjust a priority of the data flow #1, where the data flow #1 after the priority adjustment corresponds to a port queue #2 of the port 3 of the switch #1, the port queue #2 and the port queue #1 are not a same port queue, and no PFC storm occurs in the port queue #2

1340: Notification message #1

1350: Send the data flow #1 after the priority adjustment through the port queue #2 of the port 3

1360: Determine that a PFC storm in the port queue #1 of the port 3 disappears, and readjust the priority of the data flow #1, where the data flow #1 after the readjustment corresponds to the port queue #1 of the port 3

1370: Notification message #2

1380: Send the data flow #1 after the priority readjustment through the port queue #1 of the port 3

FIG. 13

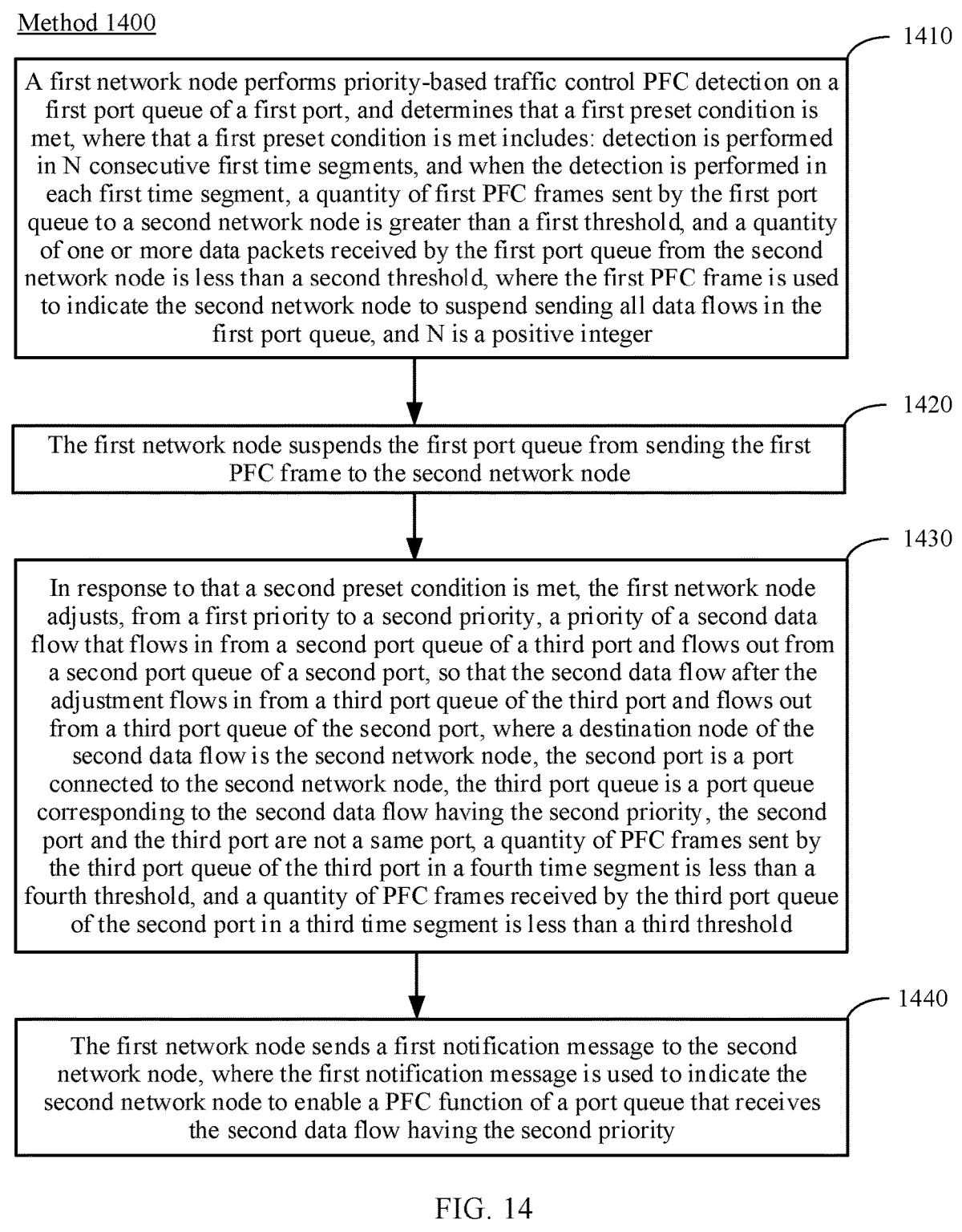

Method 1400

┌─ 1410
A first network node performs priority-based traffic control PFC detection on a first port queue of a first port, and determines that a first preset condition is met, where that a first preset condition is met includes: detection is performed in N consecutive first time segments, and when the detection is performed in each first time segment, a quantity of first PFC frames sent by the first port queue to a second network node is greater than a first threshold, and a quantity of one or more data packets received by the first port queue from the second network node is less than a second threshold, where the first PFC frame is used to indicate the second network node to suspend sending all data flows in the first port queue, and N is a positive integer ┌─ 1420
The first network node suspends the first port queue from sending the first PFC frame to the second network node ┌─ 1430
In response to that a second preset condition is met, the first network node adjusts, from a first priority to a second priority, a priority of a second data flow that flows in from a second port queue of a third port and flows out from a second port queue of a second port, so that the second data flow after the adjustment flows in from a third port queue of the third port and flows out from a third port queue of the second port, where a destination node of the second data flow is the second network node, the second port is a port connected to the second network node, the third port queue is a port queue corresponding to the second data flow having the second priority, the second port and the third port are not a same port, a quantity of PFC frames sent by the third port queue of the third port in a fourth time segment is less than a fourth threshold, and a quantity of PFC frames received by the third port queue of the second port in a third time segment is less than a third threshold ┌─ 1440
The first network node sends a first notification message to the second network node, where the first notification message is used to indicate the second network node to enable a PFC function of a port queue that receives the second data flow having the second priority

FIG. 14

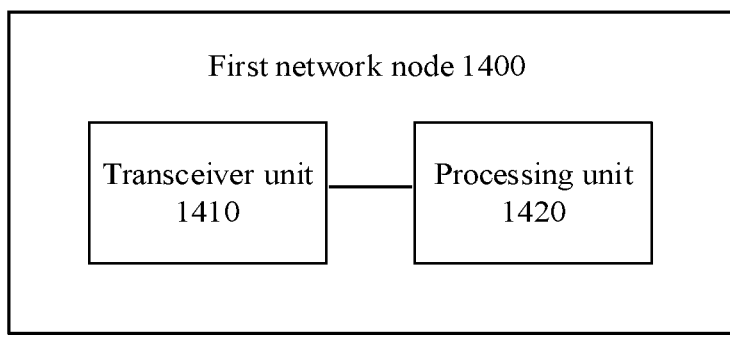
FIG. 15
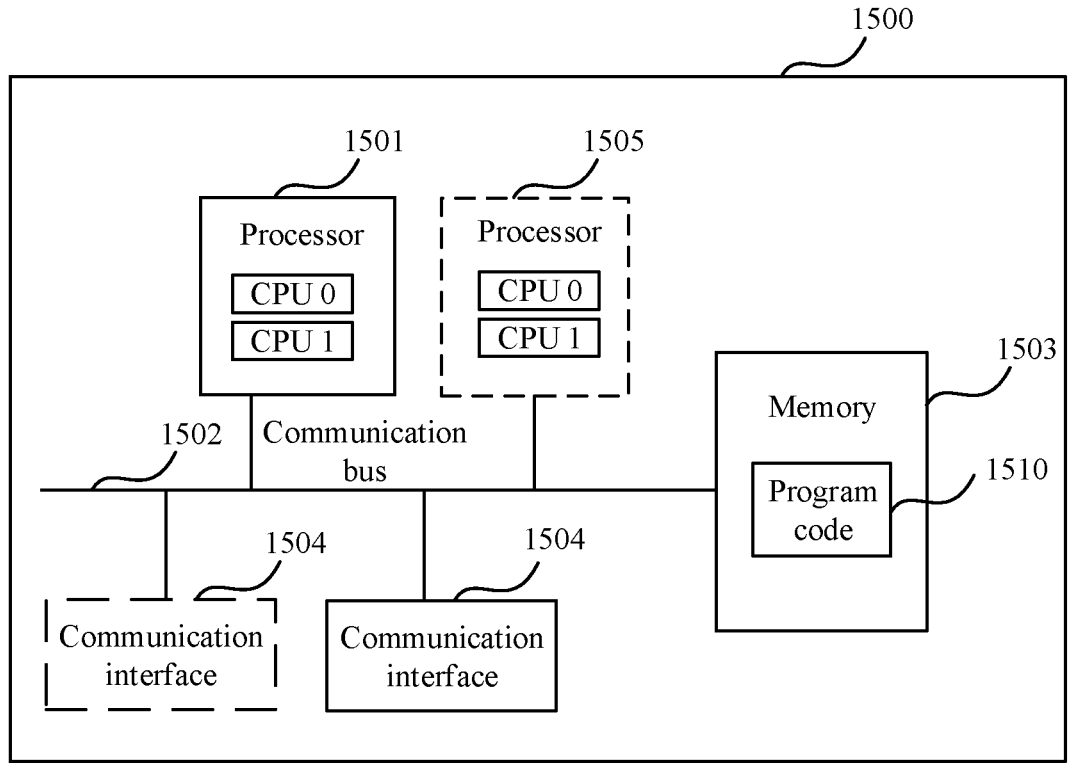
FIG. 16
FIG. 17

PFC STORM DETECTION AND PROCESSING METHOD

CROSS-REFERENCE TO RELATED APPLICATIONS

This application is a continuation of International Application No. PCT/CN2021/140389, filed on Dec. 22, 2021, which claims priority to Chinese Patent Application No. 202110572357.7, filed on May 25, 2021. The disclosures of the aforementioned applications are hereby incorporated by reference in their entirety.

TECHNICAL FIELD

This application relates to the field of network communication technologies, and more specifically, to a PFC storm detection and processing method.

BACKGROUND

At present, Ethernet is the most widely used networking technology for local area networks of computers. Currently, a priority flow control (PFC) mechanism is usually used in a network to implement a lossless network, to resolve a problem that a packet may be lost when congestion occurs in the Ethernet.

When congestion in the network is controlled by using the PFC mechanism, when the congestion occurs at a node (for example, a forwarding node) in the network because a quantity of data flows received by the node is too large, the node continuously sends PFC frames in a receiving direction of the data flows, so that a source node of the data flows suspends sending the data flows in a period from a time point at which the congestion occurs at the node to a time point at which the congestion disappears, thereby relieving the congestion. However, in this process, after the source node of the data flows receives a large quantity of PFC frames, the source node is prone to suspend sending the data flows, and thus it is difficult to better meet a service requirement of the data flows sent by the source node.

SUMMARY

This application provides a PFC storm detection and processing method. The method helps better meet a service requirement of a data flow sent by a source node.

According to a first aspect, a PFC storm detection and processing method is provided. The method includes:

A first network node performs priority-based traffic control PFC detection on a first port queue of a first port, and determines that a first preset condition is met, where that a first preset condition is met includes: detection is performed in N consecutive first time segments, and when the detection is performed in each first time segment, a quantity of first PFC frames sent by the first port queue to a second network node is greater than a first threshold, and a quantity of one or more data packets received by the first port queue from the second network node is less than a second threshold, where the first PFC frame is used to indicate the second network node to suspend sending all data flows in the first port queue, and N is a positive integer; and the first network node suspends the first port queue from sending the first PFC frame to the second network node.

Optionally, in the first preset condition, that a quantity of one or more data packets received by the first port queue from the second network node is less than a second threshold may be replaced as follows: Traffic of one or more data flows received by the first port queue from the second network node is less than the second threshold.

That a first preset condition is met may be understood as that the following exists the N consecutive first time segments: A large quantity of first PFC frames are sent to the second network node by the first port queue of the first port of the first network node, causing congestion in the first port queue. Therefore, a quantity of one or more data packets that are received by the first network node from the second network node through the first port queue is less than the second threshold (for example, the second threshold may be equal to 0 or 2 megabits per second (MB/s). In this embodiment of this application, when the quantity of first PFC frames sent by the first port queue to the second network node is greater than the first threshold, it may be considered that a PFC storm occurs in the first port queue. Based on this, the first network node performs PFC detection on the first port queue of the first port, and determines that the first preset condition is met. In this case, the first network node may determine that the PFC storm occurs in the first port queue. That the first PFC frame is used to indicate the second network node to suspend sending all data flows in the first port queue may be understood as follows: At least one data flow in all the data flows forwarded by the first port queue causes the congestion in the first port queue, and thus the first PFC frame is generated, where a source node of the at least one data flow is the second network node. For example, all the data flows forwarded by the first port queue include a data flow #1 and a data flow #2. A source node of the data flow #1 is the second network node. Because a large quantity of data flows #1 are stacked, the congestion occurs in the first port queue, and thus the first PFC frame is generated. The second network node may be a source node of all the data flows forwarded by the first port queue; or the second network node may be a source node of some of the data flows forwarded by the first port queue; or the second network node may not be a source node of all the data flows forwarded by the first port queue.

In the foregoing technical solution, after the first network node performs PFC detection on the first port queue of the first port in the N consecutive first time segments, and determines that the first preset condition is met (that is, determines that the PFC storm occurs in the first port queue), the first network node suspends the first port queue from sending the first PFC frame to the second network node, where the first PFC frame is used to indicate the second network node to suspend sending all the data flows forwarded by the first port queue, so that the second network node can continue to send all the data flows forwarded by the first port queue. This helps better meet a service requirement of a data flow sent by the source node.

With reference to the first aspect, in some implementations of the first aspect, the second network node is a source node of a first data flow in the first port queue, the first data flow corresponds to the first PFC frame, duration for which the first network node suspends the first port queue from sending the first PFC frame to the second network node is a second time segment, the second time segment is consecutive to the N consecutive first time segments, the second time segment is a time segment after the N consecutive first time segments, and the following relationship is met:

$$(N \times T_1 + T_2) < (TX\_timeout).$$

$N \times T_1$ indicates the N consecutive first time segments, $T_1$ indicates any one of the N first time segments, $T_2$ indicates the second time segment, and Tx_timeout indicates a maximum timeout interval by which the second network node sends a data flow (namely, the first data flow). It may be understood that, when a timeout interval by which the second network node sends one data flow is greater than Tx_timeout, the second network node suspends sending the data flow. In other words, when a timeout interval by which the second network node sends one data flow is less than or equal to Tx_timeout, the second network node does not suspend sending the data flow. $(N \times T_1 + T_2)$ may be understood as time by which the first network node repairs the first port queue that is of the first port and in which a PFC storm occurs. A specific value of Tx_timeout is not specifically limited. For example, a value of Tx_timeout may be determined based on a type of a network adapter (also referred to as a network interface card) in a second network device. Alternatively, the value of Tx_timeout may be determined based on personal experience.

That the first PFC frame corresponds to the first data flow may be understood as follows: The first port queue of the first port of the first network node receives a large quantity of first data flows sent by the second network node, and consequently, the first PFC frame is generated because congestion occurs in the first port queue. Alternatively, the first port queue of the first port of the first network node receives a large quantity of first data flows sent by the second network node, and consequently, the first PFC frame is generated because buffer of the first port queue exceeds a preset threshold.

In the foregoing technical solution, the second network node is the source node of the first data flow in the first port queue. The first network node controls, to be not greater than Tx_timeout, the time (namely, $(N \times T_1 + T_2)$) spent in repairing the first port queue in which the PFC storm occurs, so that service interruption can be avoided when the source node (namely, the second network node) of the first data flow sends the first data flow (namely, the first data flow). This can better meet a service requirement of a data flow sent by the source node.

With reference to the first aspect, in some implementations of the first aspect, after the first network node suspends the first port queue from sending the first PFC frame to the second network node, the method further includes:

The first port queue of the first network node continues to send the first PFC frame to the second network node; and the first network node determines that the first preset condition is met, and the first network node disables a PFC function of the first port queue.

In the foregoing technical solution, after repairing the first port queue in which the PFC storm occurs, if the first network node determines, within a period, that another PFC storm occurs in the first port queue, the first network node may disable the PFC function of the first port queue, so that the following phenomenon is avoided: Service interruption occurs when the source node sends a data flow because the first port queue sends a large quantity of first PFC frames to the second network node. This helps better meet a service requirement of a data flow sent by the source node.

With reference to the first aspect, in some implementations of the first aspect, the first network node further includes a second port and a third port, the second port and the third port are not a same port, the second port is a port connected to the second network node, and the second network node is a destination node of a second data flow.

The method further includes:

In response to that a second preset condition is met, the first network node adjusts, from a first priority to a second priority, a priority of the second data flow that flows in from a second port queue of the third port and flows out from a second port queue of the second port, so that the second data flow after the adjustment flows in from a third port queue of the third port and flows out from a third port queue of the second port, where the third port queue is a port queue corresponding to the second data flow having the second priority, a quantity of PFC frames sent by the third port queue of the third port in a fourth time segment is less than a fourth threshold, and a quantity of PFC frames received by the third port queue of the second port in a third time segment is less than a third threshold.

That a quantity of PFC frames sent by the third port queue of the third port in a fourth time segment is less than a fourth threshold may be considered as follows: No PFC storm occurs in the third port queue of the third port in the fourth time segment. Similarly, that a quantity of PFC frames received by the third port queue of the second port in a third time segment is less than a third threshold may be considered as follows: No PFC storm occurs in the third port queue of the second port in the third time segment. Values of the third threshold, the fourth threshold, and the first threshold may be the same as or different from one another.

In the foregoing technical solution, the first network node may adjust the priority of the second data flow, to switch the second data flow to a port queue in which no PFC storm occurs. This helps better meet a service requirement of the second data flow, and can further prevent a second PFC frame corresponding to the second data flow before the adjustment from spreading in a network, thereby helping improve overall performance of the network. When a port queue that forwards the second data flow before the adjustment is further configured to forward another data flow, the method can further prevent, from being afflicted by the second data flow, the another data flow in the port queue that forwards the second data flow before the adjustment, thereby further meeting a service requirement of the another data flow.

With reference to the first aspect, in some implementations of the first aspect, that a second preset condition is met includes: a quantity of second PFC frames that are sent by the second network node and that are received by the second port queue of the second port in the third time segment is greater than the third threshold, and a quantity of second PFC frames that are sent by the second port queue of the third port to a third network node in the fourth time segment is greater than the fourth threshold, where the second PFC frame is used to indicate the third network node to suspend sending all data flows in the second port queue of the third port, and the first network node is an intermediate node between the third network node and the second network node.

That a second preset condition is met may be understood as follows: After the second port queue of the second port receives a large quantity of second PFC frames in the third time segment, and consequently the second port queue of the second port is congested, a large quantity of second PFC frames are sent to the third network node in the fourth time segment through the second port queue of the third port. In other words, a PFC storm occurring in the second port queue of the second port further causes a PFC storm occurring in the second port queue of the third port.

With reference to the first aspect, in some implementations of the first aspect, before the first network node adjusts, from the first priority to the second priority, the priority of the second data flow that flows in from the second port queue of the third port and flows out from the second port queue of the second port, the method further includes:

The first network node performs PFC detection on the following port queues of ports: the second port queue of the third port, the second port queue of the second port, the third port queue of the third port, and the third port queue of the second port.

With reference to the first aspect, in some implementations of the first aspect, the method further includes:

The first network node sends a first notification message to the second network node, where the second notification message is used to indicate the second network node to enable a PFC function of a port queue that receives the second data flow having the second priority.

In the foregoing technical solution, after the first network node adjusts a port queue in which the second data flow is located, the first network node can actively indicate the second network node to enable the PFC function of the port queue that receives the second data flow having the second priority, so that the second network node can continue to perform lossless transmission of the second data flow. This helps better meet a service requirement of the second data flow.

With reference to the first aspect, in some implementations of the first aspect, the method further includes:

In response to that a third preset condition is met, the first network node adjusts, from the second priority to the first priority, a priority of a second data flow that flows in from the third port queue of the third port and flows out from the third port queue of the second port, so that the second data flow after the adjustment flows in from the second port queue of the third port and flows out from the second port queue of the second port, where that a third preset condition is met includes: detection is performed in a fifth time segment for M consecutive times, and a PFC frame received by the second port queue of the second port is less than the third threshold in each time of the detection, where M is a positive integer; and the first network node sends a second notification message to the second network node, where the second notification message is used to indicate the second network node to disable the PFC function of the port queue that receives the second data flow having the second priority.

That a third preset condition is met may be understood as follows: Detection is performed in the fifth time segment for M consecutive times, and a PFC storm in the second port queue of the second port and a PFC storm in the second port queue of the third port disappear in each time of the detection. In other words, that a third preset condition is met may also be understood as follows: A PFC storm in a port queue in which the second data flow is located before port queue adjustment disappears.

In the foregoing technical solution, when the PFC storm in the port queue in which the second data flow is located before the port queue adjustment disappears, the first network node may switch the second data flow from a current port queue to the port queue in which the second data flow is located before the port queue adjustment, to avoid mutual impact between another data flow in an after-adjustment port queue (namely, the current port queue) and the second data flow. This helps better meet a service requirement of the second data flow and the another data flow.

Optionally, if the third preset condition is not met, the first network node may further send a third notification message to the second network node, where the third notification message is used to indicate the second network node to restart a network adapter (also referred to as a network interface card) of the second network node.

A field that is in the first notification message and that is used to indicate the second network node to enable the PFC function of the port queue, a field that is in the second notification message and that is used to indicate the second network node to disable the PFC function of the port queue, and a field that is in the third notification message and that is used to indicate the second network node to restart the network adapter of the second network node may each be a reserved field or a user-defined field in an existing message format in an existing standard, protocol, or specification, or may each be a field in another user-defined format that implements a same function.

With reference to the first aspect, in some implementations of the first aspect, the first network node is a switch or a router, and the second network node is a server.

According to a second aspect, a PFC storm detection and processing method is provided. The method includes:

In response to that a second preset condition is met, a first network node adjusts, from a first priority to a second priority, a priority of a second data flow that flows in from a second port queue of a third port and flows out from a second port queue of a second port, so that the second data flow after the adjustment flows in from a third port queue of the third port and flows out from a third port queue of the second port, where a destination node of the second data flow is a second network node, the second port is a port connected to the second network node, the third port queue is a port queue corresponding to the second data flow having the second priority, the second port and the third port are not a same port, a quantity of PFC frames sent by the third port queue of the third port in a fourth time segment is less than a fourth threshold, and a quantity of PFC frames received by the third port queue of the second port in a third time segment is less than a third threshold.

That a quantity of PFC frames sent by the third port queue of the third port in a fourth time segment is less than a fourth threshold may be considered as follows: No PFC storm occurs in the third port queue of the third port in the fourth time segment. Similarly, that a quantity of PFC frames received by the third port queue of the second port in a third time segment is less than a third threshold may be considered as follows: No PFC storm occurs in the third port queue of the second port in the third time segment. Values of the third threshold, the fourth threshold, and the first threshold may be the same as or different from one another.

In the foregoing technical solution, the first network node may adjust the priority of the second data flow, to switch the second data flow to a port queue in which no PFC storm occurs. This helps better meet a service requirement of the second data flow, and can further prevent a second PFC frame corresponding to the second data flow before the adjustment from spreading in a network, thereby helping improve overall performance of the network. When a port queue that forwards the second data flow before the adjustment is further configured to forward another data flow, the method can further prevent, from being afflicted by the second data flow, the another data flow in the port queue that forwards the second data flow before the adjustment, thereby further meeting a service requirement of the another data flow.

With reference to the second aspect, in some implementations of the second aspect, that a second preset condition is met includes: a quantity of second PFC frames that are sent by the second network node and that are received by the second port queue of the second port in the third time segment is greater than the third threshold, and a quantity of second PFC frames that are sent by the second port queue of the third port to a third network node in the fourth time segment is greater than the fourth threshold, where the second PFC frame is used to indicate the third network node to suspend sending all data flows in the second port queue of the third port, and the first network node is an intermediate node between the third network node and the second network node.

That a second preset condition is met may be understood as follows: After the second port queue of the second port receives a large quantity of second PFC frames in the third time segment, and consequently the second port queue of the second port is congested, a large quantity of second PFC frames are sent to the third network node in the fourth time segment through the second port queue of the third port. In other words, a PFC storm occurring in the second port queue of the second port further causes a PFC storm occurring in the second port queue of the third port.

With reference to the second aspect, in some implementations of the second aspect, before the first network node adjusts, from the first priority to the second priority, the priority of the second data flow that flows in from the second port queue of the third port and flows out from the second port queue of the second port, the method further includes:

The first network node performs PFC detection on the following port queues of ports: the second port queue of the third port, the second port queue of the second port, the third port queue of the third port, and the third port queue of the second port.

With reference to the second aspect, in some implementations of the second aspect, the method further includes:

The first network node sends a first notification message to the second network node, where the first notification message is used to indicate the second network node to enable a PFC function of a port queue that receives the second data flow having the second priority.

In the foregoing technical solution, after the first network node adjusts a port queue in which the second data flow is located, the first network node can actively indicate the second network node to enable the PFC function of the port queue that receives the second data flow having the second priority, so that the second network node can continue to perform lossless transmission of the second data flow. This helps better meet a service requirement of the second data flow.

With reference to the second aspect, in some implementations of the second aspect, the method further includes:

In response to that a third preset condition is met, the first network node adjusts, from the second priority to the first priority, a priority of a second data flow that flows in from the third port queue of the third port and flows out from the third port queue of the second port, so that the second data flow after the adjustment flows in from the second port queue of the third port and flows out from the second port queue of the second port, where that a third preset condition is met includes: detection is performed in a fifth time segment for M consecutive times, and a PFC frame received by the second port queue of the second port is less than the third threshold in each time of the detection, where M is a positive integer; and the first network node sends a second notification message to the second network node, where the second notification message is used to indicate the second network node to disable the PFC function of the port queue that receives the second data flow having the second priority.

That a third preset condition is met may be understood as follows: Detection is performed in the fifth time segment for M consecutive times, and a PFC storm in the second port queue of the second port and a PFC storm in the second port queue of the third port disappear in each time of the detection. In other words, that a third preset condition is met may also be understood as follows: A PFC storm in a port queue in which the second data flow is located before port queue adjustment disappears.

In the foregoing technical solution, when the PFC storm in the port queue in which the second data flow is located before the port queue adjustment disappears, the first network node may switch the second data flow from an after-adjustment port queue to the port queue in which the second data flow is located before the adjustment, to avoid mutual impact between another data flow in the after-adjustment port queue (namely, a current port queue) and the second data flow. This helps better meet a service requirement of the second data flow and the another data flow.

Optionally, if the third preset condition is not met, the first network node may further send a third notification message to the second network node, where the third notification message is used to indicate the second network node to restart a network adapter (also referred to as a network interface card) of the second network node.

A field that is in the first notification message and that is used to indicate the second network node to enable the PFC function of the port queue, a field that is in the second notification message and that is used to indicate the second network node to disable the PFC function of the port queue, and a field that is in the third notification message and that is used to indicate the second network node to restart the network adapter of the second network node may each be a reserved field or a user-defined field in an existing message format in an existing standard, protocol, or specification, or may each be a field in another user-defined format that implements a same function.

With reference to the second aspect, in some implementations of the second aspect, the first network node is a switch or a router, and the second network node is a server.

According to a third aspect, a first network node is provided. The first network node includes a processing unit and a transceiver unit.

The processing unit is configured to: perform priority-based traffic control PFC detection on a first port queue of a first port, and determine that a first preset condition is met, where that a first preset condition is met includes: detection is performed in N consecutive first time segments, and when the detection is performed in each first time segment, a quantity of first PFC frames sent by the first port queue to a second network node is greater than a first threshold, and a quantity of one or more data packets received by the first port queue from the second network node is less than a second threshold, where the first PFC frame is used to indicate the second network node to suspend sending all data flows in the first port queue, and N is a positive integer.

The transceiver unit is configured to suspend the first port queue from sending the first PFC frame to the second network node.

With reference to the third aspect, in some implementations of the third aspect, the second network node is a source node of a first data flow in the first port queue, the first data flow corresponds to the first PFC frame, duration for which the first port queue is suspended from sending the first PFC frame to the second network node is a second time segment, the second time segment is consecutive to the N consecutive first time segments, the second time segment is a time segment after the N consecutive first time segments, and the following relationship is met:

$$N \times T_1 + T_2 < (TX\_timeout).$$

$N \times T_1$ indicates the N consecutive first time segments, $T_1$ indicates any one of the N first time segments, $T_2$ indicates the second time segment, and Tx_timeout indicates a maximum timeout interval by which the second network node sends a data flow. It may be understood that, when a timeout interval by which the second network node sends one data flow is greater than Tx_timeout, the second network node suspends sending the data flow. In other words, when a timeout interval by which the second network node sends one data flow is less than or equal to Tx_timeout, the second network node does not suspend sending the data flow. $(N \times T_1 + T_2)$ may be understood as time by which the first network node repairs the first port queue that is of the first port and in which a PFC storm occurs. A specific value of Tx_timeout is not specifically limited. For example, a value of Tx_timeout may be determined based on a type of a network adapter (also referred to as a network interface card) in a second network device. Alternatively, the value of Tx_timeout may be determined based on personal experience.

That the first PFC frame corresponds to the first data flow may be understood as follows: The first port queue of the first port of the first network node receives a large quantity of first data flows sent by the second network node, and consequently, the first PFC frame is generated because congestion occurs in the first port queue. Alternatively, the first port queue of the first port of the first network node receives a large quantity of first data flows sent by the second network node, and consequently, the first PFC frame is generated because buffer of the first port queue exceeds a preset threshold.

With reference to the third aspect, in some implementations of the third aspect, the transceiver unit is further configured to: continue to send the first PFC frame to the second network node through the first port queue; and the processing unit is further configured to: determine that the first preset condition is met, and disable a PFC function of the first port queue.

With reference to the third aspect, in some implementations of the third aspect, the first network node further includes a second port and a third port, the second port and the third port are not a same port, the second port is a port connected to the second network node, and the second network node is a destination node of a second data flow.

The processing unit is further configured to:

in response to that a second preset condition is met, adjust, from a first priority to a second priority, a priority of the second data flow that flows in from a second port queue of the third port and flows out from a second port queue of the second port, so that the second data flow after the adjustment flows in from a third port queue of the third port and flows out from a third port queue of the second port, where the third port queue is a port queue corresponding to the second data flow having the second priority, a quantity of PFC frames sent by the third port queue of the third port in a fourth time segment is less than a fourth threshold, and a quantity of PFC frames received by the third port queue of the second port in a third time segment is less than a third threshold.

With reference to the third aspect, in some implementations of the third aspect, that a second preset condition is met includes: a quantity of second PFC frames that are sent by the second network node and that are received by the second port queue of the second port in the third time segment is greater than the third threshold, and a quantity of second PFC frames that are sent by the second port queue of the third port to a third network node in the fourth time segment is greater than the fourth threshold, where the second PFC frame is used to indicate the third network node to suspend sending all data flows in the second port queue of the third port, and the first network node is an intermediate node between the third network node and the second network node.

With reference to the third aspect, in some implementations of the third aspect, the processing unit is further configured to perform PFC detection on the following port queues of ports: the second port queue of the third port, the second port queue of the second port, the third port queue of the third port, and the third port queue of the second port.

With reference to the third aspect, in some implementations of the third aspect, the transceiver unit is further configured to send a first notification message to the second network node, where the second notification message is used to indicate the second network node to enable a PFC function of a port queue that receives the second data flow having the second priority.

With reference to the third aspect, in some implementations of the third aspect, the processing unit is further configured to: in response to that a third preset condition is met, adjust, from the second priority to the first priority, a priority of a second data flow that flows in from the third port queue of the third port and flows out from the third port queue of the second port, so that the second data flow after the adjustment flows in from the second port queue of the third port and flows out from the second port queue of the second port, where that a third preset condition is met includes: detection is performed in a fifth time segment for M consecutive times, and a PFC frame received by the second port queue of the second port is less than the third threshold in each time of the detection, where M is a positive integer; and the transceiver unit is further configured to send a second notification message to the second network node, where the second notification message is used to indicate the second network node to disable the PFC function of the port queue that receives the second data flow having the second priority.

Optionally, if the third preset condition is not met, the processing unit is further configured to send a third notification message to the second network node, where the third notification message is used to indicate the second network node to restart a network adapter (also referred to as a network interface card) of the second network node.

With reference to the third aspect, in some implementations of the third aspect, the first network node is a network device having a forwarding function, for example, a switch or a router; and the second network node is a server.

It should be understood that for technical effects brought by the third aspect or the implementations of the third aspect, refer to descriptions of the technical effects of the first aspect or the implementations of the first aspect. Details are not described herein again.

According to a fourth aspect, a first network node is provided. The first network node includes a processing unit.

The processing unit is configured to: in response to that a second preset condition is met, adjust, from a first priority to a second priority, a priority of a second data flow that flows in from a second port queue of a third port and flows out from a second port queue of a second port, so that the second data flow after the adjustment flows in from a third port queue of the third port and flows out from a third port queue of the second port, where a destination node of the second data flow is a second network node, the second port is a port connected to the second network node, the third port queue is a port queue corresponding to the second data flow having the second priority, the second port and the third port are not a same port, a quantity of PFC frames sent by the third port queue of the third port in a fourth time segment is less than a fourth threshold, and a quantity of PFC frames received by the third port queue of the second port in a third time segment is less than a third threshold.

With reference to the fourth aspect, in some implementations of the fourth aspect, that a second preset condition is met includes: a quantity of second PFC frames that are sent by the second network node and that are received by the second port queue of the second port in the third time segment is greater than the third threshold, and a quantity of second PFC frames that are sent by the second port queue of the third port to a third network node in the fourth time segment is greater than the fourth threshold, where the second PFC frame is used to indicate the third network node to suspend sending all data flows in the second port queue of the third port, and the first network node is an intermediate node between the third network node and the second network node.

With reference to the fourth aspect, in some implementations of the fourth aspect, the processing unit is further configured to perform PFC detection on the following port queues of ports: the second port queue of the third port, the second port queue of the second port, the third port queue of the third port, and the third port queue of the second port.

With reference to the fourth aspect, in some implementations of the fourth aspect, the first network node further includes a transceiver unit; and the transceiver unit is further configured to send a first notification message to the second network node, where the first notification message is used to indicate the second network node to enable a PFC function of a port queue that receives the second data flow having the second priority.

With reference to the fourth aspect, in some implementations of the fourth aspect, the processing unit is further configured to: in response to that a third preset condition is met, adjust, from the second priority to the first priority, a priority of a second data flow that flows in from the third port queue of the third port and flows out from the third port queue of the second port, so that the second data flow after the adjustment flows in from the second port queue of the third port and flows out from the second port queue of the second port, where that a third preset condition is met includes: detection is performed in a fifth time segment for M consecutive times, and a PFC frame received by the second port queue of the second port is less than the third threshold in each time of the detection, where M is a positive integer.

With reference to the fourth aspect, in some implementations of the fourth aspect, the transceiver unit is further configured to send a second notification message to the second network node, where the second notification message is used to indicate the second network node to disable the PFC function of the port queue that receives the second data flow having the second priority.

With reference to the fourth aspect, in some implementations of the fourth aspect, the first network node is a switch or a router, and the second network node is a server.

It should be understood that for technical effects brought by the fourth aspect or the implementations of the fourth aspect, refer to descriptions of the technical effects of the second aspect or the implementations of the second aspect. Details are not described herein again.

According to a fifth aspect, this application provides a first network node. The first network node has a function of implementing the method in any one of the first aspect or the second aspect and the possible implementations of the first aspect or the second aspect. The functions may be implemented by hardware, or may be implemented by hardware executing corresponding software. The hardware or the software includes one or more units corresponding to the foregoing function.

According to a sixth aspect, this application provides a first network node or another combined device, component, or the like that can implement a function of the first network node, including at least one processor and a communication interface. The at least one processor is configured to execute a computer program or instructions, so that the first network node can implement the communication method in any one of the first aspect or the second aspect and the possible implementations of the first aspect or the second aspect.

Optionally, the first network node further includes at least one memory, the at least one memory is coupled to the at least one processor, and the computer program or instructions are stored in the at least one memory. The memory may be integrated in the processor, or the memory and the processor are separately disposed.

In an implementation, the first network node is a first network node. When the first network node is the first network node, the communication interface may be a transceiver or an input/output interface.

In another implementation, the first network node is a chip or a chip system. When the first network node is the chip or the chip system, the communication interface may be an input/output interface, an interface circuit, an output circuit, an input circuit, a pin, a related circuit, or the like on the chip or in the chip system. The processor may alternatively be embodied as a processing circuit or a logic circuit.

In another implementation, the first network node is a chip or a chip system configured in the first network node.

Optionally, the transceiver may be a transceiver circuit. Optionally, the input/output interface may be an input/output circuit.

According to a seventh aspect, a computer-readable storage medium is provided, configured to store a computer program. The computer program includes instructions that are used to perform the method in any one of the first aspect or the second aspect and the possible implementations of the first aspect or the second aspect.

According to an eighth aspect, a chip system is provided, including at least one processor and an interface. The at least one processor is configured to invoke and run a computer program, so that the chip system is enabled to execute instructions of the method in any one of the first aspect or the second aspect and the possible implementations of the first aspect or the second aspect.

The chip system may be a system on chip (SOC), a baseband chip, or the like. The baseband chip may include a processor, a channel encoder, a digital signal processor, a modem, an interface module, and the like.

According to a ninth aspect, a system is provided, where the system includes the foregoing first network node.

BRIEF DESCRIPTION OF DRAWINGS

FIG. 1 is a schematic diagram of a network architecture 100 to which an embodiment of this application is applicable;

FIG. 4 is a schematic flowchart of a PFC storm detection and processing method 400 according to an embodiment of this application;

FIG. 8 is a schematic flowchart of another PFC storm detection and processing method 800 according to an embodiment of this application;

FIG. 9 is a schematic diagram of a format of a notification message applicable to an embodiment of this application;

FIG. 10 is a schematic diagram of a format of another notification message applicable to an embodiment of this application;

FIG. 11 is a schematic diagram of a format of still another notification message applicable to an embodiment of this application;

FIG. 13 is a schematic flowchart of a PFC storm detection and processing method 1300 according to an embodiment of this application;

FIG. 14 is a schematic flowchart of a PFC storm detection and processing method 1400 according to an embodiment of this application;

FIG. 15 is a schematic diagram of a structure of a first network node 1400 according to an embodiment of this application;

FIG. 16 is a schematic diagram of a hardware structure of a first network node 1500 according to an embodiment of this application; and FIG. 17 is a schematic diagram of a structure of a system 1600 according to an embodiment of this application.

DESCRIPTION OF EMBODIMENTS

Figure 2:
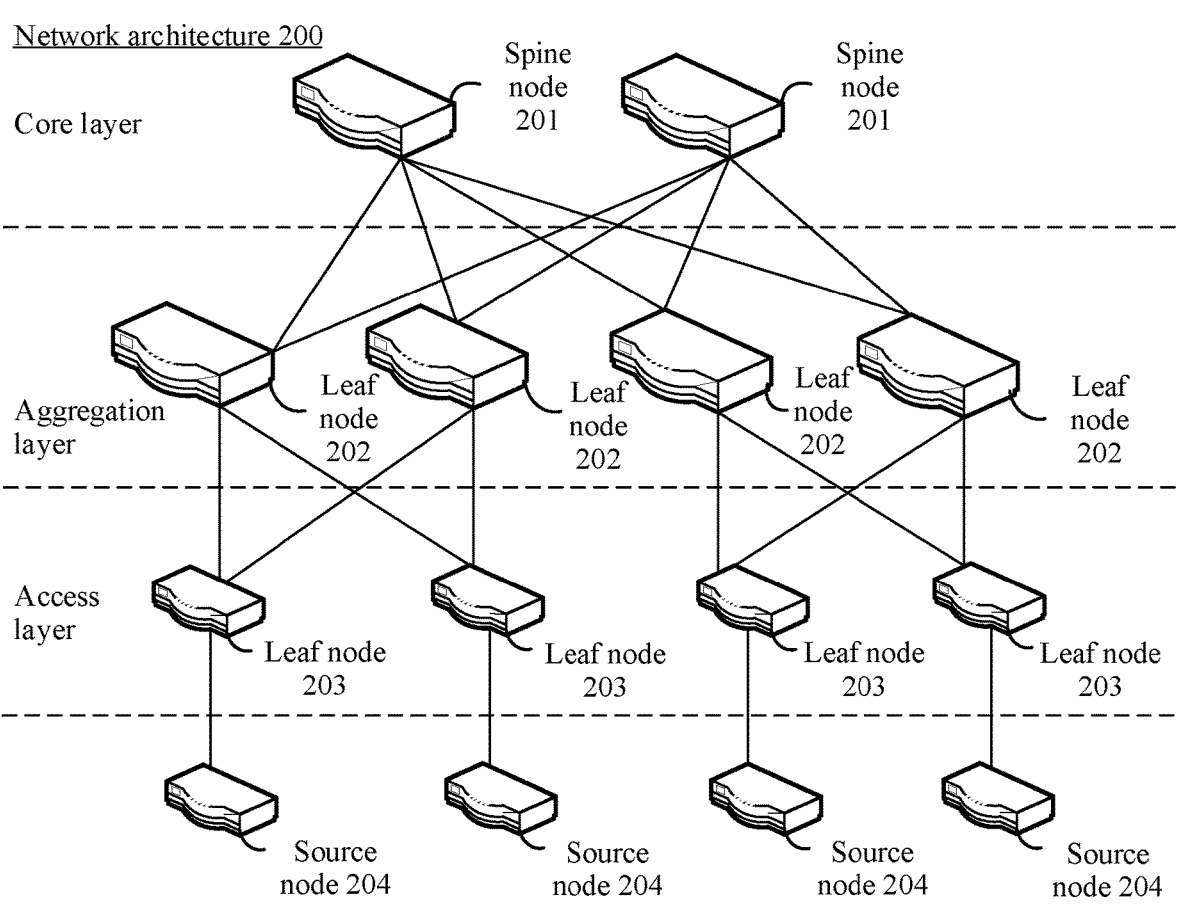
FIG. 2 is a schematic diagram of a network architecture 200 to which an embodiment of this application is applicable.

The following describes technical solutions of this application with reference to accompanying drawings. It should be understood that terms used in embodiments of this application are only used to explain specific embodiments of this application and are not intended to limit this application.

In this embodiment of this application, congested and non-congested are relative to each other. A congested condition and a non-congested condition may be set by a user based on an actual requirement. Congestion standards of different network structures may be different, and may be specifically set based on an actual situation. In this specification, a determining threshold or standard for congested and non-congested is merely an example, and is not intended to limit the present disclosure. Whether congestion occurs may be determined based on a quantity of congestion times, a sending rate, a queue buffer size, and the like. Congestion may be understood as follows: A queue is full or about to be full. In this embodiment of this application, a server may be denoted as Svr for short. For example, a server 1 may be denoted as Svr1 for short, a server 2 may be denoted as Svr2 for short, and a server 3 may be denoted as Svr3 for short.

For better understanding of a PFC storm detection and processing method provided in embodiments of this application, a network architecture to which embodiments of this application are applicable is first described with reference to FIG. 1 and FIG. 2.

FIG. 1 is a schematic diagram of a network architecture 100 to which an embodiment of this application is applicable.

As shown in FIG. 1, the network architecture 100 may also be referred to as a leaf-spine network system. The network architecture 100 includes a spine node and at least two leaf nodes that communicate with the spine node. Optionally, the network architecture 100 further includes at least one source node that supports communication with each leaf node. A quantity of spine nodes is not specifically limited. An example in which two spine nodes 101 are included is shown in FIG. 1, but does not constitute a limitation. A quantity of leaf nodes that communicate with each spine node 101 is not specifically limited, either. An example in which two leaf nodes 102 communicate with each spine node 101 is shown in FIG. 1. In addition, each leaf node communicates with one or more source nodes. An example in which three source nodes 103 communicate with each leaf node 102 is shown in FIG. 1.

As shown in FIG. 1, the network architecture 100 uses a network topology framework that includes two layers: an access layer and a core layer. Two spine nodes 101 are deployed in the core layer. Two leaf nodes 102 that communicate with the spine nodes are deployed in the access layer. Source nodes 103 that communicate with the leaf nodes are deployed under the access layer. The source node 103 may also be referred to as a host node. The spine node 101 and the leaf node 102 in the network architecture 100 are both configured to forward data traffic. One source node communicates, through a leaf node and a spine node that communicate with the source node, with a source node under another leaf node.

During actual application, each of the spine node 101 and the leaf node 102 may be deployed as a network device having a data forwarding function, for example, a switch, a router, or another device. The source node 103 may be deployed as a terminal device, including but not limited to: a mobile phone, a tablet computer (tablet personal computer), a personal digital assistant (PDA), a mobile Internet device (MID), a wearable device, a vehicle-mounted device, and another device that supports communicating with a network.

FIG. 2 is a schematic diagram of another network architecture 200 to which an embodiment of this application is applicable.

As shown in FIG. 2, the network architecture 200 may also be referred to as a leaf-spine network system. The network architecture 200 includes a spine node and at least two leaf nodes that communicate with the spine node. Optionally, the network architecture 200 further includes at least one source node that supports communication with each leaf node. A quantity of spine nodes is not specifically limited. An example in which two spine nodes 301 are included is shown in FIG. 2, but does not constitute a limitation. A quantity of leaf nodes that communicate with each spine node is not specifically limited, either. An example in which four leaf nodes 202 communicate with each spine node 201 is shown in FIG. 2. In addition, each leaf node 203 communicates with one or more source nodes. An example in which one source node 204 communicates with each leaf node 203 is shown in FIG. 2.

As shown in FIG. 2, the network architecture 200 uses a network topology framework that includes two layers: an access layer, an aggregation layer, and a core layer. Two spine nodes 201 are deployed in the core layer. Four leaf nodes 202 that communicate with the spine nodes are deployed in the aggregation layer. Four leaf nodes 203 that communicate with the leaf nodes in the aggregation layer are deployed in the access layer. Source nodes that communicate with the leaf nodes 203 in the access layer are deployed under the access layer. Each source node 204 may also be referred to as a host node. Each spine node in the network architecture 200 and each leaf node in the access layer are both configured to forward data traffic. Each leaf node in the aggregation layer is configured to connect the core layer with the access layer, and is located at a middle position. Each leaf node in the aggregation layer is capable of processing all communication traffic from each leaf node in the access layer, and providing an uplink to the core layer.

During actual application, each of the spine node 201, the leaf node 202, and the leaf node 203 may be deployed as a network device having a data forwarding function, for example, a switch, a router, or another device. The source node 204 may be deployed as a terminal device, including but not limited to: a mobile phone, a tablet computer (tablet personal computer), a personal digital assistant (PDA), a mobile Internet device (MID), a wearable device, a vehicle-mounted device, and another device that supports communicating with a network.

It should be understood that FIG. 1 and FIG. 2 are merely examples, and do not constitute any limitation on a network architecture to which embodiments of this application are applicable. Optionally, the network architecture to which embodiments of this application are applicable may alternatively be another type of network, for example, a data center network (DCN), a metropolitan area network (MAN), a wide area network, or a campus network. Optionally, the network architecture 100 shown in FIG. 1 is used as an example. The network architecture 100 may further include more spine nodes 101, leaf nodes 102, and source nodes 103. Optionally, the network architecture 200 shown in FIG. 2 is used as an example. The network architecture 200 may further include more spine nodes 201, leaf nodes 202, leaf nodes 203, and source nodes 204.

Currently, in a process of implementing communication between a transmit end and a receive end in a network (for example, the network architecture shown in FIG. 1 or FIG. 2) by using a network device to forward a data packet, a fault of a hardware device (including a network device or a receive end) in a communication network, a fault of a transmission link, and/or abnormal performance of a router may cause loss of a data packet; and loss of any data packet may cause retransmission of a large quantity of data packets, which severely affects data transmission performance. Therefore, in the foregoing communication process, a PFC mechanism is usually enabled to ensure that no packet is lost. However, in a network using a PFC mechanism, if a quantity of PFC frames that are continuously sent by a port of a device in the network within a period exceeds a preset threshold, a PFC storm occurs in the port of the device. Further, if the PFC storm in the port of the device continues to spread in the entire network, a PFC storm (also referred to as a "congestion tree") is formed in the entire network. As a result, a service in the communication network is affected greatly.

A concept of the PFC storm in the foregoing embodiment of this application is described below by using a communication network shown in FIG. 3.

Figure 3:
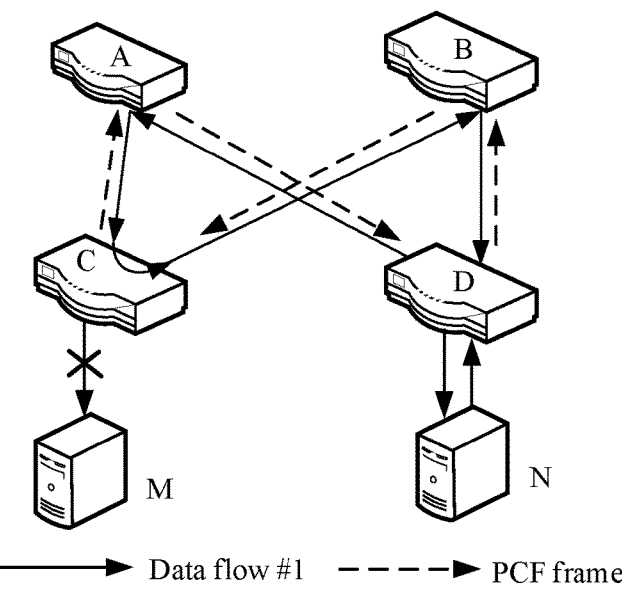
FIG. 3 is a schematic diagram of describing occurrence of a PFC storm in a network based on the network architecture 100 shown in FIG. 1.

For example, FIG. 3 is a schematic diagram of describing occurrence of a PFC storm in a network based on the network architecture 100 shown in FIG. 1. As shown in FIG. 3, the communication network includes a network device A, a network device B, a network device C, and a network device D. The network device A and the network device B are upper-layer network devices. The network device C and the network device D are lower-layer network devices. For example, in a two-layer network (for example, the network shown in FIG. 1), the network device A and the network device B are aggregation-layer network devices, and the network device C and the network device D are access-layer network devices. For another example, in a three-layer network device (for example, the network shown in FIG. 2), the network device A and the network device B are core network devices, and the network device C and the network device D are aggregation-layer network devices; or, the network device A and the network device B are aggregation-layer network devices, and the network device C and the network device D are access-layer network devices. An example in which the network device A and the network device B in FIG. 3 are aggregation-layer network devices and the network device C and the network device D in FIG. 3 are access-layer network devices is used below for description. Refer to FIG. 3. The network device C is connected to a server M, and the network device D is connected to a server N. It is assumed that a normal transmission path of the data flow #1 sent by the server N to the server M is: server N→network device D network device A→network device C→server M. When the server M becomes faulty, the network device C cannot transmit the data flow #1 to the server M. In this case, to prevent loss of a packet, the network device C transmits the data flow #1 to the network device B, the network device B transmits the data flow #1 to the network device D, and finally, the network device D returns the data flow #1 to the server N. If congestion occurs, at the same time, in output port queues that are used to buffer the data flow #1 and that are in the network device A, the network device B, the network device C, and the network device D, a PFC frame sent by the network device D to the network device B exceeds a preset threshold, a PFC frame sent by the network device B to the network device C exceeds the preset threshold, a PFC frame sent by the network device C to the network device A exceeds the preset threshold, and a PFC frame sent by the network device A to the network device D exceeds a preset threshold. In other words, it may be considered that a PFC storm occurs in the output port queue that is used to buffer the data flow #1 and that is in each network device in the communication network. In this case, a PFC storm occurs in the communication network.

This application provides a PFC storm detection and processing method. The method can avoid service interruption when a source node sends a data flow, thereby helping meet a service requirement of the data flow sent by the source node.

The PFC storm detection and processing method provided in this application is described below in detail with reference to FIG. 4 to FIG. 14.

FIG. 4 is a schematic flowchart of a PFC storm detection and processing method 400 according to an embodiment of this application.

As shown in FIG. 4, the method 400 includes step 410 and step 420. The method 400 may be, but is not limited to be, applied to the network architectures shown in FIG. 2 and FIG. 3. When the method 400 is applied to the network architecture 100, a first network node in the method 400 may be a spine node 101 or a leaf node 102, and a second network node in the method 400 may be a source node 103. When the method 400 is applied to the network architecture 200, the first network node in the method 400 may be a spine node 201, a leaf node 202, or a leaf node 203, and the second network node in the method 400 may be a source node 204. Step 410 and step 420 are described below in detail.

Step 410: The first network node performs priority-based traffic control PFC detection on a first port queue of a first port, and determines that a first preset condition is met, where that a first preset condition is met includes: detection is performed in N consecutive first time segments, and when the detection is performed in each first time segment, a quantity of first PFC frames sent by the first port queue to a second network node is greater than a first threshold, and a quantity of one or more data packets received by the first port queue from the second network node is less than a second threshold, where the first PFC frame is used to indicate the second network node to suspend sending all data flows in the first port queue, and N is a positive integer.

A structure between the first network node and the second network node is not specifically limited. In an example, the first network node and the second network node are two network nodes that are directly connected to each other. For example, the first network node may be a leaf node 102 in the network architecture 100, and the second network node may be a source node 103 in the network architecture 100. In another example, the first network node and the second network node are two network nodes that are not directly connected to each other. In this case, there is another network node between the first network node and the second network node. For example, the first network node is a leaf node 202 in the network architecture 200, the second network node is a source node 204 in the network architecture 200, and a leaf node 203 is an intermediate node between the leaf node 202 and the source node 204. A type and a quantity of data flows forwarded by the first port queue of the first port of the first network node are not limited. For example, the first port queue of the first port may be used to forward only one type of data flow. For example, the first port queue of the first port may alternatively be used to forward a plurality of types of data flows.

In this embodiment of this application, when the quantity of first PFC frames sent by the first port queue to the second network node is greater than the first threshold, it may be considered that a PFC storm occurs in the first port queue. Based on this, the first network node performs PFC detection on the first port queue of the first port, and determines that the first preset condition is met. In this case, the first network node may determine that a PFC storm occurs in the first port queue.

That a first preset condition is met may be understood as that the following exists the N consecutive first time segments: A large quantity of first PFC frames are sent to the second network node by the first port queue of the first port of the first network node, causing congestion in the first port queue. Therefore, a quantity of one or more data packets that are received by the first network node from the second network node through the first port queue is less than the second threshold (for example, the second threshold may be equal to 0 or 2 megabits per second (MB/s). Based on this, the first port queue of the first port of the first network node continuously sends a large quantity of first PFC frames to the second network node until congestion in the first port queue disappears. Then, the first port queue stops sending the first PFC frame to the second network node. Accordingly, after receiving one first PFC frame, the second network node parses the first PFC frame and performs a corresponding operation. A relationship between the first time segment and a period from a time at which the congestion occurs in the first port queue of the first network node to a time at which the congestion disappears is not specifically limited. For example, the first time segment may be the period from the time at which the congestion occurs in the first port queue of the first network node to the time at which the congestion disappears. For example, the first time segment may alternatively be a period in the period from the time at which the congestion occurs in the first port queue to the time at which the congestion disappears.

In an implementation, the first PFC frame is used to indicate the second network node to suspend sending all the data flows in the first port queue, the second network node may be a source node of all the data flows in the first port queue, and at least one data flow of all the data flows forwarded by the first port queue causes the congestion in the first port queue or buffer of the first port queue exceeds a preset threshold. As a result, the first PFC frame is generated. For example, all the data flows forwarded by the first port queue include a data flow #1 and a data flow #2. A source node of the data flow #1 and the data flow #2 is the second network node. Because a large quantity of data flows #1 are stacked, the congestion occurs in the first port queue, and thus the first PFC frame is generated.

In another implementation, the first PFC frame is used to indicate the second network node to suspend sending all data flows in the first port queue, the second network node may be a source node of some of the data flows in the first port queue, and at least one data flow of the some data flows causes the congestion in the first port queue. As a result, the first PFC frame is generated. For example, all the data flows forwarded by the first port queue include a data flow #1, a data flow #2, and a data flow #3. A source node of the data flow #1 and the data flow #2 is the second network node. Because a large quantity of data flows #1 are stacked, the congestion occurs in the first port queue, and thus the first PFC frame is generated.

In the foregoing step 410, the first network node performs PFC detection on the first port queue of the first port, and determines that the first preset condition is met in the first time segment, that is, the first network node determines that the PFC storm occurs in the first port queue of the first port. That a PFC storm occurs in a port queue may be understood as follows: In one or more consecutive times of detection performed by the port queue in a preset time, a quantity of PFC frames sent by the port queue exceeds a preset threshold, and a quantity of data packets received by the port is less than a preset threshold. A type and a quantity of data flows forwarded by the first port queue of the first port of the first network node are not limited. For example, the first port queue of the first port may be used to forward only one type of data flow. For example, the first port queue of the first port may alternatively be used to forward a plurality of types of data flows.

Figure 5:
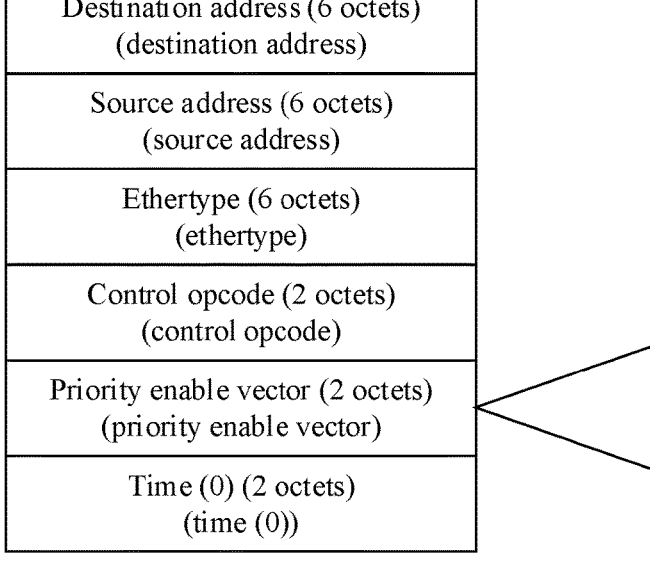
FIG. 5 is a schematic diagram of a structure of a first PFC frame applicable to an embodiment of this application.

In the foregoing step 410, the first PFC frame is used to indicate the second network node to suspend sending all the data flows in the first port queue. It may be understood that the first PFC frame includes identifiers of all the data flows in the first port queue of the first port, as well as duration for which the second network node suspends sending all the data flows in the first port queue. For example, if the first port queue of the first port is used to forward only the data flow #1, the first PFC frame includes an identifier of the data flow #1, as well as duration for which the second network node suspends sending the data flow #1. For example, a structure of a first PFC frame applicable to this embodiment of this application is shown in FIG. 5. The PFC frame shown in FIG. 5 includes the following fields:

Destination address (DA): 6 octets, used to indicate a destination MAC address of a data frame.

Source address (SA): 6 octets, used to indicate a source MAC address of the data frame.

Ethertype: 2 octets, used to indicate a type of the frame.

Control opcode: 2 octets, used to indicate a control code.

Priority enable vector (PEV): 2 octets, used to indicate a backpressure enable vector, where a first octet is directly set to 0; 8 bits of a second octet E(N) correspond to eight priority queues defined in the PFC mechanism, indicating whether sending of data in a priority queue N needs to be suspended; and when E(N)=1, it indicates that sending of the data in the priority queue N needs to be suspended, and suspension duration is time (N) described below; or when E(N)=0, it indicates that sending of the data in the priority queue N does not need to be suspended, where N is an integer from 0 to 7.

Time (time (0)–time (7)): each has 2 octets and is a suspension timer, used to indicate duration for which sending of data in a corresponding priority queue is suspended. A unit of the duration may be time used for transmitting 512-bit data at a transmission rate of a current physical chip. For example, if E(3)=1 in the PEV, and time (3)=8, the PFC frame indicates suspension of sending of data in a priority queue 3, and the suspension duration is time required for sending, at the transmission rate of the current physical chip, data that has 8×512=4096 bits.

Pad: 26 octets.

Cyclic redundancy check (CRC): 4 octets.

In this embodiment of this application, the first network node may be a network device having a forwarding function, for example, a switch or a router; and the second network node may be a server.

Step 420: The first network node suspends the first port queue from sending the first PFC frame to the second network node.

The first network node suspends the first port queue from sending the first PFC frame to the second network node. Accordingly, after the second network node receives the first PFC frame, the second network node suspends sending all the data flows in the first port queue.

In some implementations, the second network node is a source node of a first data flow in the first port queue, the first data flow corresponds to the first PFC frame, duration for which the first network node suspends the first port queue from sending the first PFC frame to the second network node is a second time segment, the second time segment is consecutive to the N consecutive first time segments, the second time segment is a time segment after the N consecutive first time segments, and the following relationship is met:

$$(N \times T_1 + T_2) < (TX\_timeout).$$

$N \times T_1$ indicates the N consecutive first time segments, $T_1$ indicates any one of the N first time segments, $T_2$ indicates the second time segment, and Tx_timeout indicates a maximum timeout interval by which the second network node sends a data flow. It may be understood that, when a timeout interval by which the second network node sends one data flow is greater than Tx_timeout, the second network node suspends sending the data flow. In other words, when a timeout interval by which the second network node sends one data flow is less than or equal to Tx_timeout, the second network node does not suspend sending the data flow. $(N \times + T_2)$ may be understood as time by which the first network node repairs the first port queue that is of the first port and in which a PFC storm occurs. A specific value of Tx_timeout is not specifically limited. For example, a value of Tx_timeout may be determined based on a type of a network adapter (also referred to as a network interface card) in a second network device. Alternatively, the value of Tx_timeout may be determined based on personal experience. It may be understood that, when a timeout interval by which the second network node sends one data flow is greater than Tx_timeout, the second network node suspends sending the data flow. Consequently, a service corresponding to the data flow is suspended.

That the first PFC frame corresponds to the first data flow may be understood as follows: The first port queue of the first port of the first network node receives a large quantity of first data flows sent by the second network node, and consequently, the first PFC frame is generated because congestion occurs in the first port queue. Alternatively, the first port queue of the first port of the first network node receives a large quantity of first data flows sent by the second network node, and consequently, the first PFC frame is generated because buffer of the first port queue exceeds a preset threshold.

Optionally, after the foregoing step 420, the first network node may further perform the following steps:

The first port queue of the first network node continues to send the first PFC frame to the second network node; and the first network node determines that the first preset condition is met, and the first network node disables a PFC function of the first port queue. The foregoing method 400 is described by using an example in which a port queue of each network node forwards a data flow. The foregoing data flow may be replaced with a data packet, a message, a data frame, or the like for description.

In this embodiment of this application, after the first network node performs detection on the first port queue of the first port in the first time segment, and determines that the PFC storm occurs in the first port queue, the first network node suspends, in the second time segment, the first port queue from sending the first PFC frame to the second network node, where the first PFC frame is used to indicate the second network node to suspend sending all the data flows forwarded by the first port queue of the first port of the first network node, so that the second network node can continue to send all the data flows forwarded by the first port queue. This helps better meet a service requirement of a data flow sent by the source node. Specifically, when the second network node is the source node of the first data flow in the first port queue, the first network node controls, to be not greater than Tx_timeout, the time (namely, $(N \times T_1 + T_2)$) spent in repairing the first port queue in which the PFC storm occurs, so that service interruption can be avoided when the source node (namely, the second network node) of the first data flow sends the first data flow (namely, the first data flow). This can better meet a service requirement of a data flow sent by the source node.

With reference to specific examples in FIG. 6 and FIG. 7, the embodiment described in FIG. 4 of this application is described below in more detail. It should be noted that these examples are merely intended to help a person skilled in the art better understand embodiments of this application, but are not intended to limit embodiments of this application to a specific value or a specific scenario shown in the examples. A person skilled in the art can apparently make various equivalent modifications or changes based on the examples described below, and such modifications and changes also fall within the scope of embodiments of this application.

Figure 6:
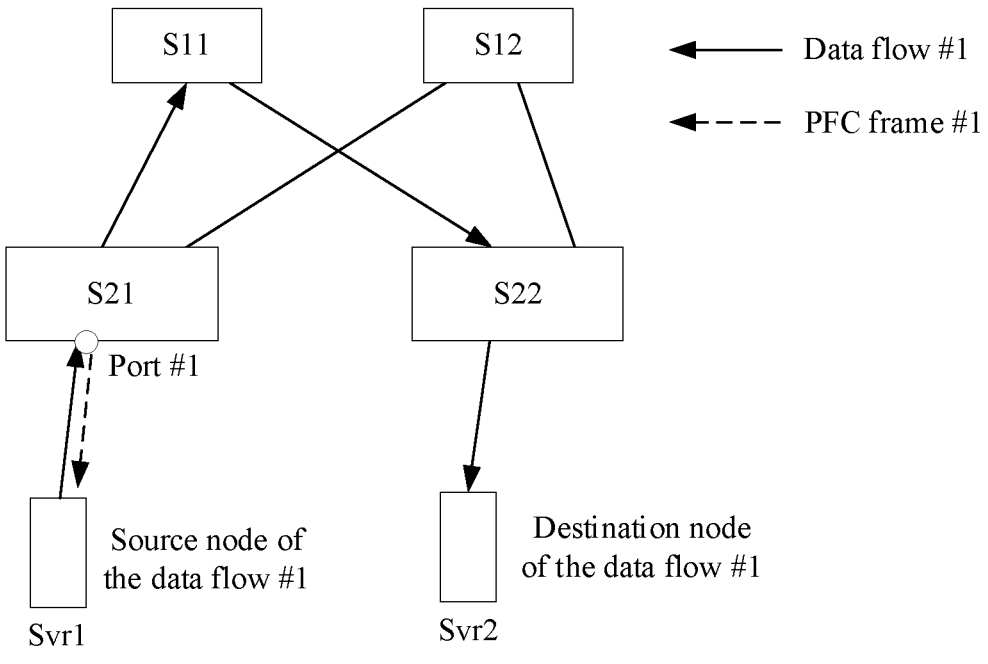
FIG. 6 is a schematic diagram of an application scenario according to an embodiment of this application.

FIG. 6 is a schematic diagram of an application scenario according to an embodiment of this application.

As shown in FIG. 6, a normal transmission path by which a source end server Svr1 (namely, a source node of a data flow #1) sends the data flow #1 to a destination server Svr2 (namely, a destination node of the data flow #1) sequentially includes a node S21, a node S11, a node S22, and Svr2. Each node (for example, the node S21) that forwards the data flow #1 may be a switch or a router. In FIG. 6, congestion occurs in a port queue #1 of a port #1 of S21 (the queue is full or is about to be full). To relieve the congestion, S21 sends a large quantity of PFC frames #1 to Svr1, where the PFC frames #1 are used to indicate Svr1 to suspend sending all data flows in the port queue #1 of the port #1 of S21. When the congestion in the port queue #1 of the port #1 of S21 disappears, S21 stops sending the PFC frame #1 to Svr1.

It should be noted that the connection manner shown in FIG. 6 is merely an example. The node S21 and the server Svr1 do not need to be connected to each other directly, and may alternatively be connected to each other indirectly through one layer or a plurality of layers of switches or routers (for example, the network architecture shown in FIG. 2). In addition, the node S22 and the server Svr2 do not need to be connected to each other directly, and may alternatively be connected to each other indirectly through one layer or a plurality of layers of switches or routers (for example, the network architecture shown in FIG. 2).

Figure 7:
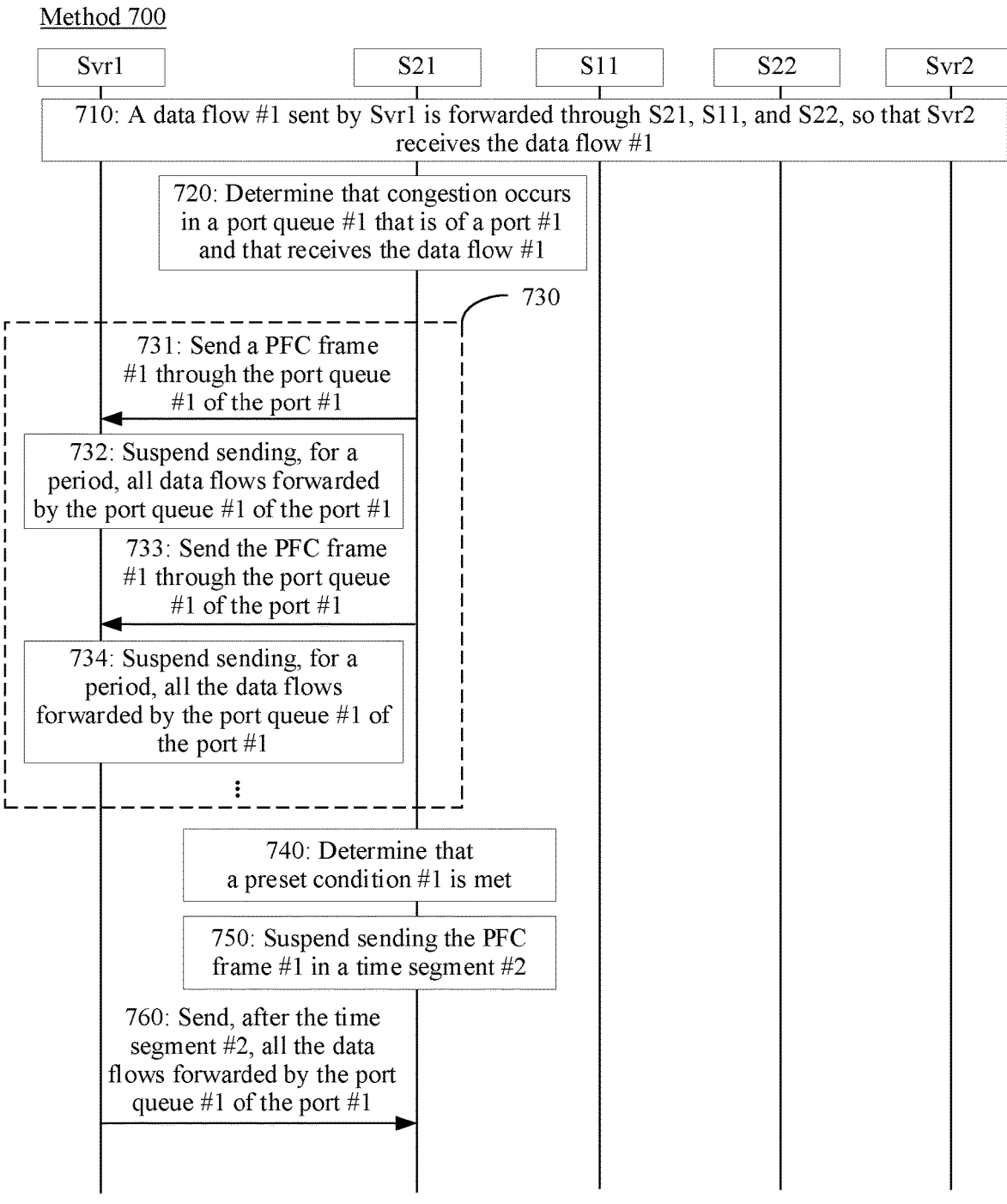
FIG. 7 is a schematic flowchart of a PFC storm detection and processing method 700 according to an embodiment of this application.

The following uses the application scenario shown in FIG. 6 as an example to describe, with reference to FIG. 7, a specific embodiment of the PFC storm detection and processing method 400 provided in embodiments of this application.

FIG. 7 is a schematic flowchart of a PFC storm detection and processing method 700 according to an embodiment of this application. As shown in FIG. 7, the method 700 includes step 710 to step 760. Step 710 to step 760 are described below in detail.

It may be understood that, in FIG. 7, Svr1 is an example of the second network node in the foregoing method 400; S21 is an example of the first network node in the foregoing method 400; a data flow #1 is an example of the data flow forwarded by the first port queue of the first port in the foregoing method 400; a port #1 is an example of the first port in the foregoing method 400; a port queue #1 is an example of the first port queue in the foregoing method 400; a PFC frame #1 is an example of the first PFC frame in the foregoing method 400; a preset condition #1 is an example of the first preset condition in the foregoing method 400; a time segment #1 is an example of the first time segment in the foregoing method 400; and a time segment #2 is an example of the second time segment in the foregoing method 400.

Step 710: The data flow #1 sent by Svr1 is forwarded through S21, S11, and S22, so that Svr2 receives the data flow #1.

A forwarding process includes a normal transmission path by which a source end server Svr1 (namely, a source node of the data flow #1) sends the data flow #1 to a destination server Svr2 (namely, a destination node of the data flow #1), sequentially including: a node S21, a node S11, a node S12, a node S22, and Svr2. Specifically, the port queue #1 of the port #1 of S21 receives the data flow #1 from Svr1.

Step 720: S21 determines that congestion occurs in the port queue #1 that is of the port #1 and that receives the data flow #1.

An operation performed by S21 includes but is not limited to determining, based on a quantity of congestion times, a sending rate, or a queue buffer size of the port queue #1 of the port #1 or the like, that the congestion occurs in the port queue #1. In this embodiment of this application, that congestion occurs in a port queue may be understood as follows: The port queue is full or is about to be full.

In this embodiment of this application, a type of a priority of a data flow forwarded by the port queue #1 of the port #1 is not specifically limited. In an example, the port queue #1 is used to forward only data flows that have one priority. For example, the port queue #1 is used to forward only data flows whose priority is 0. In this case, a priority of the data flow #1 is 0. In another example, the port queue #1 may be used to forward data flows that have a plurality of priorities. For example, the port queue #1 may be used to forward a data flow whose priority is 0 to 7. In this case, the priority of the data flow #1 is any one of the priority 0 to the priority 7.

It may be understood that, before S21 determines that the congestion in the port queue #1 does not disappear, S21 continuously sends the PFC frame #1 to Svr1. Accordingly, each time Svr1 receives a PFC frame #1, Svr1 performs a corresponding operation. For ease of description, a period from a time at which the congestion occurs in the port queue #1 to a time at which the congestion in the port queue #1 disappears is denoted as a time segment #3. In other words, step 730 is performed in the time segment #3. Step 730 may specifically include step 731, step 732, step 733, step 734, and the like. In other words, step 730 may include: a step in which S21 sends the PFC frame #1 through the port queue #1 of the port #1 (for example, step 731 and step 733), and a step in which Svr1 suspends sending all data flows forwarded by the port queue #1 of the port #1 for a period (for example, step 732 and step 734). FIG. 7 shows an example in which every time S21 sends one PFC frame #1, Svr1 performs a corresponding operation after receiving the PFC frame #1. The following specifically describes step 731 and step 732. It should be understood that FIG. 7 may further include more step 731 or step 733. Accordingly, FIG. 7 may further include more step 733 or step 734.

Step 731: S21 sends the PFC frame #1 to Svr1 through the port queue #1 of the port #1.

The PFC frame #1 is used to indicate Svr1 to suspend sending all data flows in the port queue #1 of the port #1. The PFC frame #1 further carries suspension duration and identifiers of all the data flows forwarded by the port queue #1 of the port #1. A specific structure of the PFC frame #1 may be the structure of the PFC frame shown in FIG. 5.

It may be understood that, the PFC frame #1 exerts backpressure on only the data flow forwarded by the port queue #1 of the port #1 of S21, instead of exerting the backpressure on the entire port #1. In other words, all port queues of the port #1 except the port queue #1 are not affected by the backpressure of the PFC frame #1.

Step 732: Svr1 suspends sending, to S21, all data flows forwarded by the port queue #1 of the port #1.

All the data flows forwarded by the port queue #1 of the port #1 of S21 include the data flow #1. Svr1 performs identification on the PFC frame #1 received from S21, to obtain the suspension duration and an identifier of the port queue #1 of the port #1. In the suspension duration, Svr1 suspends sending, to S21, all the data flows forwarded by the port queue #1.

It may be understood that, after Svr1 suspends sending, to S21, all the data flows forwarded by the port queue #1 of the port #1, because the congestion occurs in the port queue #1, S21 continuously sends the PFC frame #1 to Svr1 before the congestion in the port queue #1 disappears.

Step 740: S21 determines that the preset condition #1 is met.

That the preset condition #1 is met includes: detection is performed in N consecutive time segments #1, and when the detection is performed in each time segment #1, a quantity of first PFC frames sent by the port queue #1 to Svr1 is greater than a first threshold, and a quantity of one or more data packets received by the port queue #1 from Svr1 is less than a second threshold, where the PFC frame #1 is used to indicate Svr1 to suspend sending all data flows in the port queue #1, and N is a positive integer. Values of the first threshold and the second threshold are not specifically limited.

The N consecutive time segments #1 are a period including a period from a time at which the congestion occurs in the port queue #1 of the port #1 of S21 to a time at which the congestion disappears.

Step 750: S21 suspends sending the PFC frame #1 to Svr1 in the time segment #2.

The time segment #2 is consecutive to the N consecutive time segments #1, the time segment #2 is a time segment after the N consecutive time segments #1, and the following relationship is met:

$$(N \times T_1 + T_2) < (TX\_timeout).$$

$N \times T_1$ indicates the N consecutive time segments #1, $T_1$ indicates the time segment #1, $T_2$ indicates the time segment #2, and Tx_timeout indicates a maximum timeout interval by which Svr1 sends a data flow. It may be understood that, when a timeout interval by which Svr1 sends one data flow is greater than Tx_timeout Svr1 suspends sending the data flow. In other words, when a timeout interval by which Svr1 sends one data flow is less than or equal to Tx_timeout, Svr1 does not suspend sending the data flow. A specific value of Tx_timeout is not specifically limited. For example, a value of Tx_timeout may be determined based on a type of a network adapter (also referred to as a network interface card) in Svr1. Alternatively, the value of Tx_timeout may be determined based on personal experience. It may be understood that, when a timeout interval by which Svr1 sends one data flow is greater than Tx_timeout, Svr1 suspends sending the data flow.

Step 760: Svr1 sends, to S21 after the time segment #2, all the data flows forwarded by the port queue #1 of the port #1.

Optionally, after step 710 to step 760, S21 may further perform the following steps:

The port queue #1 of the port #1 of S21 continues to send the first PFC frame to Syrl.

S21 determines that the preset condition #1 is met, and S21 disables a PFC function of the port queue #1 of the port #1.

In this embodiment of this application, when a PFC storm occurs in the port queue #1 that is of the port #1 and that forwards the data flow #1, S21 can detect, remedy, and control the PFC storm that occurs in the port queue #1, to avoid the following problem: A service of Svr1 is interrupted because Svr1 receives a large quantity of PFC frames #1 sent by S21. This helps better meet a service requirement of the data flow #1 sent by Svr1.

A PFC storm detection and processing method provided in embodiments of this application is described above in detail with reference to FIG. 4 to FIG. 7. Another PFC storm detection and processing method provided in an embodiment of this application is described below in detail with reference to FIG. 8 to FIG. 13.

FIG. 8 is a schematic flowchart of another PFC storm detection and processing method 800 according to an embodiment of this application.

As shown in FIG. 8, the method 800 includes step 810. Optionally, the method 800 may further include step 820. Step 810 and step 820 are described below in detail.

Step 810: In response to that a second preset condition is met, a first network node adjusts, from a first priority to a second priority, a priority of a second data flow that flows in from a second port queue of a third port and flows out from a second port queue of a second port, so that the second data flow after the adjustment flows in from a third port queue of the third port and flows out from a third port queue of the second port, where a destination node of the second data flow is a second network node, the second port is a port connected to the second network node, the third port queue is a port queue corresponding to the second data flow having the second priority, the second port and the third port are not a same port, a quantity of PFC frames sent by the third port queue of the third port in a fourth time segment is less than a fourth threshold, and a quantity of PFC frames received by the third port queue of the second port in a third time segment is less than a third threshold.

In the foregoing step 810, the first network node is a forwarding device at an access layer. For example, the first network node may be the leaf node 102 in the network architecture 100 shown in FIG. 1. In this case, the second network node may be the source node 103. For example, the first network node may alternatively be the leaf node 203 in the network architecture 200 shown in FIG. 2. In this case, the second network node may be the source node 204. The third port of the first network node may be a port that is directly connected to the server, or the third port may be a port that is directly connected to a forwarding device (for example, a switch or a router). The second network node in the foregoing step 810 is a destination node of the second data flow. Specifically, the second network node may be a server. The server is denoted as a server #1. In this case, when the third port of the first network node is a port connected to a server, the server is denoted as a server #2. The server #1 and the server #2 are not a same server.

In some implementations, that a second preset condition is met includes: a quantity of second PFC frames that are sent by the second network node and that are received by the second port queue of the second port in the third time segment is greater than the third threshold, and a quantity of second PFC frames that are sent by the second port queue of the third port to a third network node in the fourth time segment is greater than the fourth threshold, where the second PFC frame is used to indicate the third network node to suspend sending all data flows in the second port queue of the third port, and the first network node is an intermediate node between the third network node and the second network node.

That a quantity of second PFC frames that are sent by the second network node and that are received by the second port queue of the second port in the third time segment is greater than the third threshold may be considered as follows: A PFC storm occurs in the second port queue of the second port in the third time segment. Similarly, that a quantity of second PFC frames that are sent by the second port queue of the third port to a third network node in the fourth time segment is greater than the fourth threshold may be considered as follows: A PFC storm occurs in the second port queue of the third port in the fourth time segment. Values of the third threshold and the fourth threshold may be the same as or different from each other. That a second preset condition is met may be understood as follows: After the second port queue of the second port receives a large quantity of second PFC frames in the third time segment, and consequently the second port queue of the second port is congested, a large quantity of second PFC frames are sent to the third network node in the fourth time segment through the second port queue of the third port. In other words, a PFC storm occurring in the second port queue of the second port further causes a PFC storm occurring in the second port queue of the third port.

In the foregoing step 810, that a quantity of PFC frames sent by the third port queue of the third port in a fourth time segment is less than a fourth threshold may be considered as follows: No PFC storm occurs in the third port queue of the third port in the fourth time segment. Similarly, that a quantity of PFC frames received by the third port queue of the second port in a third time segment is less than a third threshold may be considered as follows: No PFC storm occurs in the third port queue of the second port in the third time segment. Values of the third threshold and the fourth threshold may be the same as or different from each other.

In the foregoing step 810, before the priority is adjusted, the second data flow having the first priority flows in through the second port queue of the third port of the first network node, and flows out from the second port queue of the second port. After the priority is adjusted, the second data flow having the second priority flows in through the third port queue of the third port of the first network node, and flows out from the third port queue of the second port. In other words, a port queue corresponding to the second data flow having the first priority is the second port queue, and a port queue corresponding to the second data flow having the second priority is the third port queue. The first priority and the second priority are different. A relationship between specific values of the first priority and the second priority is not limited. In other words, only the following needs to be ensured: The two priorities correspond to different port queues in a same port. For example, the first priority may be greater than the second priority, or the first priority may be less than the second priority. For example, priorities corresponding to the second port queue of the third port of the first network node are 0 to 7; priorities corresponding to the third port queue of the third port are 8 to 15; and before the first network node adjusts the priority of the second data flow, the priority of the second data flow is 6. In other words, a port queue in which the second data flow is located before the priority is adjusted is the second port queue of the third port. Then, the first network node adjusts the priority of the second data flow from 6 to 9. In other words, a port queue in which the second data flow is located after the priority is adjusted is the third port queue of the third port.

Optionally, a data flow that flows in from the second port queue of the third port of the first network node and flows out from the second port queue of the second port may further include another data flow other than the second data flow. Based on this, after the first network node adjusts the port queue of the second data flow, another data flow in the port queue in which the second data flow is located before the adjustment can be prevented from being afflicted by the second data flow. In addition, a second PFC frame before the adjustment can be prevented from spreading in an entire network. This helps improve overall performance of the network.

For example, before the adjustment, the first network node receives a data flow #1 and a data flow #2 that are sent by the third network node, and both the two data flows flow in from the second port queue of the third port of the first network node and flow out from the second port queue of the second port, so that the destination node, namely, the second network node receives the data flow #1 and the data flow #2. A quantity of PFC frames #2 that are sent by the second network node and that are received by the second port queue of the second port is greater than a preset threshold, and a quantity of PFC frames #2 that are sent by the second port queue of the third port to the third network node is greater than the preset threshold, where the PFC frame #2 is used to indicate the third network node to suspend forwarding all the data flows in the second port queue of the third port of the first network node, and the PFC frame #2 is generated because the data flow #1 flowing in from the second port queue of the third port of the first network node causes congestion. Accordingly, after receiving the PFC frame #2, the third network node suspends forwarding all data flows (namely, the data flow #1 and the data flow #2) in the second port queue of the third port. In this case, the data flow #2 is afflicted by the data flow #1. After the adjustment, the data flow #1 flows in from the third port queue of the third port of the first network node and flows out from the third port queue of the second port, and the data flow #2 flows in from the second port queue of the third port of the first network node and flows out from the second port queue of the second port. After the adjustment, no PFC storm occurs in the third port queue of the third port and the third port queue of the second port. In other words, after the adjustment, the data flow #1 and the data flow #2 correspond to different port queues of a same port of the first network node, so that the data flow #2 can be prevented from being afflicted by the data flow #1. In addition, no PFC storm occurs in the port queue in which the data flow #1 is located after the adjustment, and a PFC frame #1 before the adjustment can be prevented from spreading in a network. This helps improve overall performance of the network.

In this embodiment of this application, a quantity of second ports included in the first network node and a quantity of third ports included in the first network node are not specifically limited. When the second data flow has only one destination node, the first network node may include only one second port. When the second data flow has a plurality of destination nodes, the first network node may include a plurality of second ports, and a quantity of second PFC frames that are sent by the second network node and that are received by a second port queue of each second port in the third time segment is greater than the third threshold. When the first network node has only one port used for forwarding the data flow #2, the first network node may include one third port. When the first network node has a plurality of ports used for forwarding the data flow #2, the first network node may include a plurality of third ports, and a quantity of second PFC frames sent by a second port queue of the third port to the third network node in the fourth time segment is greater than the fourth threshold. For ease of description, the second ports are denoted as A1, A2, . . . , and AL, where AL represents an Lt second port, that is, the first network node includes L second ports, where L is a positive integer. The third ports are denoted as A1, A2, . . . , AM, where AM represents an $M^{th}$ third port, that is, the first network node includes M third ports, where M is a positive integer. For example, the first network node includes one second port (namely, a port A), and the first network node includes a plurality of third ports (namely, a port BM, where M is a positive integer greater than or equal to 2). The following are obtained by combining the port A and the ports B of the first network node in pairs: B1A, B2A, . . . , BMA, where BMA represents a data flow #2 that flows in from the third port of the first network node and flows out from the second port of the first network node.

Optionally, after the foregoing step 810, the first network node may further perform the following operations:

In response to that a third preset condition is met, the first network node adjusts, from the second priority to the first priority, a priority of a second data flow that flows in from the third port queue of the third port and flows out from the third port queue of the second port, so that the second data flow after the adjustment flows in from the second port queue of the third port and flows out from the second port queue of the second port, where that a third preset condition is met includes: detection is performed in a fifth time segment for M consecutive times, and a PFC frame received by the second port queue of the second port is less than the third threshold in each time of the detection, where M is a positive integer.

The first network node sends a second notification message to the second network node, where the second notification message is used to indicate the second network node to disable a PFC function of a port queue that receives the second data flow having the second priority.

In the foregoing technical solution, after the first network node determines that a PFC storm in the port queue in which the second data flow is located before the priority adjustment disappears, the first network node may further switch the port queue that corresponds to the second data flow after the priority adjustment to the port queue in which the second data flow is located before the priority adjustment.

After the foregoing step 810, the first network node may further perform the following operations:

If the third preset condition is not met, the first network node may further send a third notification message to the second network node, where the third notification message is used to indicate the second network node to restart a network adapter of the second network node. The network adapter is also referred to as a network interface card.

It may be understood that, in the foregoing step 810, the first network node is a node directly connected to a source node that sends the second data flow, that is, the first network node is also referred to as an intermediate node that forwards the second data flow. The first network node determines to respond to the second preset condition being met. The first network node adjusts, from the first priority to the second priority, the priority of the second data flow that flows in from the second port queue of the third port and flows out from the second port queue of the second port. In other words, in this embodiment of this application, whether the priority of the second data flow forwarded by the first network node needs to be adjusted is determined by the first network node (the intermediate node that forwards the second data flow), and adjusting the priority of the second data flow from the first priority to the second priority is performed by the first network node. In still other words, the following operations are not performed by the source node of the second data flow: determining whether the priority of the second data flow sent by the source node needs to be adjusted; and adjusting, from the first priority to the second priority, the priority of the second data flow sent by the source node. In yet other words, a priority of the second data flow that is received by the first network node from the source node is the first priority. Then, after the first network node performs step 810, the first network node modifies the priority of the second data flow from the first priority to the second priority.

Step 820: The first network node sends a first notification message to the second network node, where the first notification message is used to indicate the second network node to enable a PFC function of a port queue that receives the second data flow having the second priority.

The first notification message is used to indicate the second network node to enable the PFC function of the port queue that receives the second data flow having the second priority. Accordingly, after the second network node enables the PFC function of the port queue that receives the second data flow having the second priority, the second network node may perform PFC detection on the port queue that receives the second data flow having the second priority.

In this embodiment of this application, a field that is in the first notification message and that is used to indicate the second network node to enable the PFC function of the port queue that receives the second data flow having the second priority, a field that is in the second notification message and that is used to indicate the second network node to disable the PFC function of the port queue that receives the second data flow having the second priority, and a field that is in the third notification message and that is used to indicate the second network node to restart the network adapter of the second network node may each be a reserved field or a user-defined field in an existing message format in an existing standard, protocol, or specification, or may each be a field in another user-defined format that implements a same function.

In an example, the field may be a congestion notification packet (CNP) message defined in a specification of the remote direct memory access over converged Ethernet (Ro-CEv2) protocol. As shown in FIG. 9, each of a reserved field 6 (reserved-6, Resv6) and a reserved field 7 (reserved-7, Resv7) may be used as a field that is used to indicate the second network node to enable or disable the PFC function of the port queue that receives the second data flow having the second priority.

In another example, a link layer discovery protocol (LLDP), for example, (IEEE Std. 802.1AB), defines a format of an LLDP data unit (LLDPDU). In the format, reserved type-length-value (TLV) and user-defined No. 127 TLV may also be used to carry information that is used to indicate the second network node to enable or disable the PFC function of the port queue that receives the second data flow having the second priority. For details, refer to FIG. 10. If the user-defined No. 127 TLV is used, a user-defined format defined in IEEE Std. 802.1AB and shown in FIG. 11 should be used.

In this embodiment of this application, the method described in the foregoing step 810 is performed only at the first network node (namely, the intermediate node that forwards the second data flow). In this embodiment of this application, a quantity of data flows forwarded by a port queue that corresponds to the second priority corresponding to the second data flow after the adjustment is not limited. In an example, the port queue that corresponds to the second priority corresponding to the second data flow after the adjustment is used to forward only the second data flow after the adjustment. In another example, the port queue that corresponds to the second priority corresponding to the second data flow after the adjustment may be used to forward the second data flow after the adjustment and another data flow other than the second data flow. In this embodiment of this application, an example in which each node forwards a data flow is used for description. The foregoing data flow may be replaced with a data packet, a message, a data frame, or the like for description.

It should be understood that the method 800 described in FIG. 8 is merely an example, and does not constitute any limitation on the PFC storm detection and processing method provided in embodiments of this application. In an example, the method 800 may include only the foregoing step 810. Optionally, the method 800 may further include step 820.

In this embodiment of this application, the first network node may adjust the priority of the second data flow, to switch the second data flow to a port queue in which no PFC storm occurs, so that a second PFC frame corresponding to the second data flow before the adjustment can be prevented from spreading in a network. This helps better meet a service requirement of the second data flow, and improve overall performance of the network. When a port queue that forwards the second data flow before the adjustment is further configured to forward another data flow, the PFC storm detection and processing method provided in this embodiment of this application can prevent, from being afflicted by the second data flow, the another data flow in the port queue that forwards the second data flow before the adjustment, thereby further meeting a service requirement of the another data flow.

A specific embodiment of step 810 described in FIG. 8 of this application is described with reference to FIG. 12 and FIG. 13. It should be noted that these examples are merely intended to help a person skilled in the art better understand embodiments of this application, but are not intended to limit embodiments of this application to a specific value or a specific scenario shown in the examples. A person skilled in the art can apparently make various equivalent modifications or changes based on the examples described below, and such modifications and changes also fall within the scope of embodiments of this application.

Figure 12:
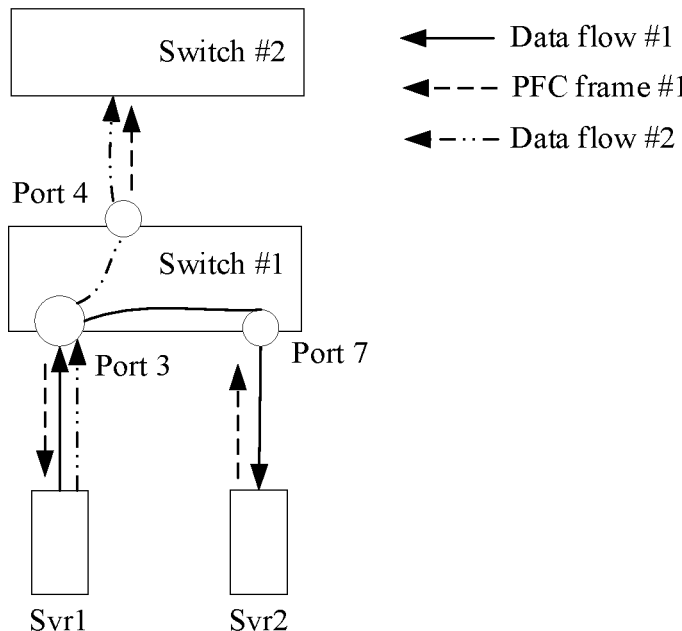
FIG. 12 is a schematic diagram of an application scenario according to an embodiment of this application.

FIG. 12 is a schematic diagram of an application scenario according to an embodiment of this application. As shown in FIG. 12, a normal transmission path by which a source end server Svr1 sends a data flow #1 to a destination server Svr2 is as follows: Svr1 sends the data flow #1, a port queue #1 of a port 3 of a switch #1 receives the data flow #1, a port queue #1 of a port 7 of the switch #1 sends the data flow #1, and Svr2 receives the data flow #1. A normal transmission path by which the source end server Svr1 sends a data flow #2 through the switch #1 is as follows: Svr1 sends the data flow #2, a port queue #1 of a port 3 of the switch #1 receives the data flow #2, and the port queue #1 of the port 3 of the switch #1 sends the data flow #2.

In a period, service software of Svr2 is abnormal. Consequently, a processing capability of a queue that processes the data flow #1 is insufficient. Svr2 sends PFC frames #1 to the port 7 of the switch #1, where a quantity of the PFC frames #1 exceeds a preset threshold, the PFC frame #1 is used to indicate Svr1 to suspend sending all data flows (namely, the data flow #1 and the data flow #2) in the port queue #1 of the port 3 of the switch #1, and the PFC frame #1 is generated because the data flow #1 that flows in from the port queue #1 of the port 3 of the switch #1 causes congestion. Accordingly, in the period, after the port queue #1 of the port 7 of the switch #1 receives a large quantity of PFC frames #1, and consequently congestion occurs in the port queue #1 of the port 7. Further, buffer of the port queue #1 of the port 3 of the switch #1 is gradually accumulated and reaches a threshold. Then, the switch #1 sends PFC frames #1 to Svr1 through the port queue #1 of the port 3, where a quantity of the PFC frames #1 exceeds the preset threshold. Because a port queue that is of the port 3 and through which the switch #1 receives the data flow #2 is the same as a port queue that is of the port 3 and through which the switch #1 receives the data flow #1, after the switch #1 sends the PFC frame #1 to Svr1, Svr1 performs identification on the received PFC frame #1, and then determines to suspend sending the data flow #1 and the data flow #2. As a result, the data flow #2 is afflicted by the data flow #1, and a service requirement of the data flow #2 is seriously affected. It may be understood that, when buffer of port queues that are used to forward the data flow #1 and that are of the port 3 and the port 7 reaches a threshold, and Svr2 continues sending the PFC frame #1, the PFC frame #1 is sent to a switch #2 through a port queue 1 of a port 4 of the switch #1, so that the PFC frame #1 spreads in the network. This affects performance of the entire network.

The following uses the application scenario shown in FIG. 12 as an example to describe, with reference to FIG. 13, a specific embodiment of step 810 in the PFC storm detection and processing method 800 provided in embodiments of this application.

FIG. 13 is a schematic flowchart of a PFC storm detection and processing method 1300 according to an embodiment of this application. As shown in FIG. 13, the method includes step 1310 to step 1380. Step 1310 to step 1380 are described below in detail.

It may be understood that, a switch #1 in FIG. 13 is an example of the first network node in the foregoing method 800. Svr2 is an example of the second network node in the foregoing method 800; Svr1 is a source node of the data flow #1 and the data flow #2, and Svr1 is an example of the third network node in the foregoing method 800; the switch #2 is an example of the third network node in the foregoing method 800; a port queue #1 of a port 3 is an example of the second port queue of the third port in the foregoing method 800; a port queue #2 of the port 3 is an example of the third port queue of the third port in the foregoing method 800; a port queue #1 of a port 7 is an example of the second port queue of the second port in the foregoing method 800; a port queue #2 of the port 7 is an example of the third port queue of the second port in the foregoing method 800; a data flow #1 is an example of the second data flow in the foregoing method 800; a PFC frame #1 is an example of the second PFC frame in the foregoing method 800; a preset condition #2 is an example of the second preset condition in the foregoing method 800; a notification message #1 is an example of the first notification message in the foregoing method 800; and a notification message #2 is an example of the second notification message in the foregoing method 800.

Step 1310: The data flow #1 sent by Svr1 is forwarded through a port of the port 3 of the switch #1, so that Svr2 receives the data flow #1; and the data flow #2 flows in through the port queue #1 of the port 3 of the switch #1 and flows out from a port queue #1 of a port 4, where the data flow #1 flows in from the port queue #1 of the port 3 and flows out from the port queue #1 of the port 7.

Step 1321: Svr2 sends the PFC frame #1 to the switch #1.

The PFC frame #1 is used to indicate Svr1 to suspend sending all data flows in the port queue #1 of the port 3 of the switch #1. The PFC frame #1 carries suspension duration and an identifier of the port queue #1 of the port 3 of the switch #1, or the PFC frame #1 carries suspension duration and identifiers of all the data flows in the port queue #1 of the port 3 of the switch #1.

In an example, when Svr2 determines that congestion occurs in a port queue that receives the data flow #1, for example, a length of the port queue that receives the data flow #1 exceeds a preset length, Svr2 may send the PFC frame #1 to the switch #1.

In the foregoing step 1321, Svr2 sends the PFC frame #1 to the switch #1. Accordingly, the switch #1 receives the PFC frame #1 from Svr2, and performs identification on the PFC frame #1, to perform a corresponding operation (not shown in the figure).

Step 1322: The switch #1 sends the PFC frame #1 to the switch #2.

It may be understood that when congestion occurs in both the port queue #1 of the port 3 of the switch #1 and the port queue #1 of the port 7 of the switch #1, the switch #1 sends the PFC frame #1 to the switch #2 through the port queue #1 of the port 4. Accordingly, after receiving the PFC frame #1 from the switch #1, the switch #2 performs identification on the PFC frame #1 and performs a corresponding operation (not shown in the figure).

Step 1323: The switch #1 sends the PFC frame #1 to Svr1.

Accordingly, after receiving the PFC frame #1 from switch #1, Svr1 performs identification on the PFC frame #1 and performs a corresponding operation (not shown in the figure). It may be understood that, before Svr2 determines that the congestion in the port queue that receives the data flow #1 does not disappear, Svr2 continuously sends the PFC frame #1. Accordingly, after Svr2 receives the PFC frame #1, Svr2 forwards the PFC frame #1 to the switch #2 and Svr1.

Step 1330: The switch #1 determines that the preset condition #2 is met, and adjusts a priority of the data flow #1, where the data flow #1 after the priority adjustment corresponds to the port queue #2 of the port 3 of the switch #1, the port queue #2 and the port queue #1 are not a same port queue, and no PFC storm occurs in the port queue #2.

After the switch #1 adjusts the priority of the data flow #1, the port queue #2 that is of the port 3 and that corresponds to the data flow #1 is different from a port queue that is of the port 3 of the switch #1 and that corresponds to the data flow #2. Subsequently, congestion occurs in the port queue #2 that is of the port 3 of the switch #1 and that forwards the data flow #2, and the switch #1 sends a PFC frame #2 to Svr1, where the PFC frame #2 is used to indicate Svr1 to suspend sending all data flows in the port queue #2 of the port 3 of the data flow #2 after the priority adjustment. In this case, the data flow #2 is not affected by a PFC frame #2 of the data flow #1, that is, after receiving the PFC frame #2, Svr1 still sends the data flow #2, and the switch #1 may receive the data flow #2 through the port queue #1 of the port 3.

After the switch #1 adjusts the priority of the data flow #1, the PFC storm in the port queue #1 of the port 3 of the switch #1 disappears, so that the PFC storm in the port queue #1 of the port 3 can be prevented from spreading in the network.

In addition, the data flow #1 after the priority adjustment corresponds to the port queue #2 of the port 3. The port queue #2 that is of the port 3 and that corresponds to the data flow #1 after the priority adjustment is a port queue in which no PFC storm occurs. This helps meet a service requirement of the data flow #1, and improve overall performance of the network.

In the foregoing step 1330, the port queue #2 that is of the port 3 and that corresponds to the data flow #1 after the priority adjustment may be used to forward only the data flow #1 after the priority adjustment. The priority of the data flow #1 before the adjustment may be greater than the priority of the data flow #1 after the adjustment, or the priority of the data flow #1 before the adjustment may be less than the priority of the data flow #1 after the adjustment, provided that the data flow #1 before the adjustment and the data flow #1 after the adjustment correspond to different port queues of a same port.

Step 1340: The switch #1 sends the notification message #1 to Svr2. Accordingly, Svr2 receives the notification message #1 from the switch #1.

The notification message #1 is used to indicate Svr2 to enable a PFC function of the port queue that receives the data flow #1 after the priority adjustment. Svr2 performs identification on the received notification message #1, and enables the PFC function of the port queue that receives the data flow #1 after the priority adjustment.

Step 1350: The switch #1 sends the data flow #1 after the priority adjustment to Svr2 through the port queue #2 of the port 3.

Step 1360: The switch #1 determines that a PFC storm in the port queue #1 of the port 3 disappears, and readjusts the priority of the data flow #1, where the data flow #1 after the readjustment corresponds to the port queue #1 of the port 3.

Step 1370: The switch #1 sends the notification message #2 to Svr2. Accordingly, Svr2 receives the notification message #2 from the switch #1.

The notification message #2 is used to indicate Svr2 to disable a PFC function of the port queue that forwards the data flow #1 after the priority adjustment. Svr2 performs identification on the received notification message #2, and disables the PFC function of the port queue that forwards the data flow #1 after the priority adjustment.

Step 1380: The switch #1 sends the data flow #1 after the priority readjustment to Svr2 through the port queue #1 of the port 3.

In this embodiment of this application, the switch #1 may adjust the priority of the data flow #1, to switch the data flow #1 to a port queue in which no PFC storm occurs, so that the PFC frame #1 that corresponds to the data flow #1 before the adjustment can be prevented from spreading in the network, and the data flow #2 can be prevented from being afflicted by the data flow #1. This helps better meet service requirements of the data flow #1 and the data flow #2, and improve overall performance of the network.

The two PFC storm detection and processing methods provided in embodiments of this application are described above with reference to FIG. 4 and FIG. 8. It may be understood that the two PFC storm detection and processing methods may also be combined for use in an existing network.

FIG. 14 is a schematic flowchart of still another PFC storm detection and processing method 1400 according to an embodiment of this application.

As shown in FIG. 14, the method 1400 includes step 1410. The method 1400 may be, but is not limited to be, applied to the network architectures shown in FIG. 2 and 33
34

FIG. 3. When the method 1400 is applied to the network architecture 100, a first network node in the method 1400 may be a leaf node 102, and a second network node in the method 1400 may be a source node 103. When the method 1400 is applied to the network architecture 200, the first network node in the method 1400 may be a leaf node 203, and the second network node in the method 1400 may be a source node 204. Step 1410 to step 1440 are described below.

Step 1410: The first network node performs priority-based traffic control PFC detection on a first port queue of a first port, and determines that a first preset condition is met, where that a first preset condition is met includes: detection is performed in N consecutive first time segments, and when the detection is performed in each first time segment, a quantity of first PFC frames sent by the first port queue to a second network node is greater than a first threshold, and a quantity of one or more data packets received by the first port queue from the second network node is less than a second threshold, where the first PFC frame is used to indicate the second network node to suspend sending all data flows in the first port queue, and N is a positive integer.

That a quantity of one or more data packets received by the first port queue from the second network node is less than a second threshold may be replaced as follows: Traffic of one or more data flows received by the first port queue from the second network node is less than a preset threshold.

In this embodiment of this application, the first network node and the second network node are two network nodes that are directly connected to each other. The second network node may be a server. The first network node may be a forwarding device (for example, a router or a switch) directly connected to the server.

A specific method of the foregoing step 1410 is the same as the method described in the foregoing step 410. For details about content that is not described in detail herein, refer to the content in the foregoing step 410.

Step 1420: The first network node suspends the first port queue from sending the first PFC frame to the second network node.

A specific method of the foregoing step 1420 is the same as the method described in the foregoing step 420. For details about content that is not described in detail herein, refer to the content in the foregoing step 420.

Step 1430: In response to that a second preset condition is met, the first network node adjusts, from a first priority to a second priority, a priority of a second data flow that flows in from a second port queue of a third port and flows out from a second port queue of a second port, so that the second data flow after the adjustment flows in from a third port queue of the third port and flows out from a third port queue of the second port, where a destination node of the second data flow is the second network node, the second port is a port connected to the second network node, the third port queue is a port queue corresponding to the second data flow having the second priority, the second port and the third port are not a same port, a quantity of PFC frames sent by the third port queue of the third port in a fourth time segment is less than a fourth threshold, and a quantity of PFC frames received by the third port queue of the second port in a third time segment is less than a third threshold.

A relationship between the second port queue of the third port and the first port queue of the first port is not limited. In some implementations, the second port queue of the third port and the first port queue of the first port may be a same port queue corresponding to a same port of the first network node. In some other implementations, the second port queue of the third port and the first port queue of the first port may be different port queues corresponding to a same port of the first network node.

A relationship among the first threshold, the second threshold, the third threshold, and the fourth threshold is not specifically limited.

A specific method of the foregoing step 1430 is the same as the method described in the foregoing step 810. For details about content that is not described in detail herein, refer to the content in the foregoing step 810.

Step 1440: The first network node sends a first notification message to the second network node, where the first notification message is used to indicate the second network node to enable a PFC function of a port queue that receives the second data flow having the second priority.

A specific method of the foregoing step 1440 is the same as the method described in the foregoing step 820. For details about content that is not described in detail herein, refer to the content in the foregoing step 820.

In this embodiment of this application, in one aspect, after the first network node performs detection on the first port queue of the first port in the first time segment, and determines that a PFC storm occurs in the first port queue, the first network node suspends, in the second time segment, the first port queue from sending the first PFC frame to the second network node. The first PFC frame is used to indicate the second network node to suspend receiving all the data flows (including the first data flow) forwarded by the first port queue, so that the second network node (a source node of the first data flow) that sends the first data flow can continue to send the first data flow. This can avoid service interruption when the second network node sends the first data flow, thereby helping better meet a service requirement of the first data flow. In another aspect, the first network node may adjust the priority of the second data flow, to switch the second data flow to a port queue in which no PFC storm occurs, so that the second PFC frame that corresponds to the second data flow before the adjustment can be prevented from spreading in a network. This helps better meet a service requirement of the second data flow, and improve overall performance of the network. When a port queue that forwards the second data flow before the adjustment is further configured to forward another data flow, the PFC storm detection and processing method provided in this embodiment of this application can prevent, from being afflicted by the second data flow, the another data flow in the port queue that forwards the second data flow before the adjustment, thereby further meeting a service requirement of the another data flow.

With reference to FIG. 1 to FIG. 14, the foregoing describes in detail a network architecture applicable to this application and a PFC storm detection and processing method provided in this application. The following describes in detail a first network node and a system provided in this application with reference to FIG. 15 to FIG. 17. It should be understood that the description of the method embodiment corresponds to the description of the apparatus embodiment. Therefore, for a part that is not described in detail, refer to the foregoing method embodiment.

FIG. 15 is a schematic diagram of a structure of a first network node 1400 according to this application. The first network node 1400 has any function of the first network node in the method 400, the method 800, or the method 1400, any function of S21 in the method 700, or any function of the switch #1 in the method 1300. As shown in FIG. 15, the first network node 1400 includes a processing unit 1420, configured to perform step 410, step 810, step 720, step 740, step 750, step 1330, step 1410, or step 1430. Optionally, the first network node 1400 further includes a transceiver unit 1410, configured to perform receiving step 420, step 820, step 731, step 733, step 1322, step 1323, step 1340, step 1350, step 1370, step 1380, step 1420, step 1440, or the like.

The first network node 1400 corresponds to the first network node in the foregoing method embodiment. For example, the modules in the first network node 1400 and the foregoing other operations and/or functions are respectively used to implement the steps and methods implemented by the first network node in the embodiment of the foregoing method 400, the foregoing method 800, or the foregoing method 1400. For specific details, refer to the foregoing method 400, the foregoing method 800, or the foregoing method 1400. For example, the modules in the first network node 1400 and the foregoing other operations and/or functions are respectively used to implement the steps and methods implemented in S21 in the method embodiment of the foregoing method 700. For specific details, refer to the foregoing method 700. For example, the modules in the first network node 1400 and the foregoing other operations and/or functions are respectively used to implement the steps and methods implemented by the switch #1 in the method embodiment of the foregoing method 1300. For specific details, refer to the foregoing method 1300. For brevity, details are not repeated herein again.

When the first network node 1400 performs congestion control, division of the foregoing functional modules is merely used as an example for description. In actual application, the foregoing functions may be allocated to different functional modules for implementation according to a requirement, that is, an internal structure of the first network node 1400 is divided into different functional modules, to implement all or some of the functions described above.

FIG. 16 is a schematic diagram of a hardware structure of a first network node 1500 according to an embodiment of this application.

The first network node 1500 corresponds to the first network node in the foregoing method embodiment. The hardware and the modules of the first network node 1500 and the foregoing other operations and/or functions are respectively used to implement the steps and methods implemented by the first network node in the method embodiment. For details about how the first network node 1500 performs congestion control, refer to the foregoing method embodiment. For brevity, details are not described herein again. The steps in the method 400, the method 800, or the method 1400 are implemented by using a hardware integrated logic circuit in the processor of the first network node 1500, or by using instructions in a form of software. The steps of the method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory. The processor reads information in the memory, and completes the steps of the foregoing methods in combination with hardware in the processor. To avoid repetition, details are not described herein again.

As shown in FIG. 16, the first network node 1500 includes at least one processor 1501, a communication bus 1502, a memory 1503, and at least one communication interface

1504. The first network node 1500 may be implemented by using a general bus architecture.

The processor 1501 may be a general-purpose CPU, an NP, or a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The communication bus 1502 is configured to transfer information between the foregoing components. The communication bus 1502 may be classified into an address bus, a data bus, a control bus, and the like. For ease of representation, only one thick line is used to represent the bus in the figure, but this does not mean that there is only one bus or only one type of bus.

The memory 1503 may be a read-only memory (ROM) or another type of static storage device capable of storing static information and instructions, or may be a random access memory (RAM) or another type of dynamic storage device capable of storing information and instructions, or may be an electrically erasable programmable read-only memory (EE-PROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or a data structure and capable of being accessed by a computer. This is not limited thereto. The memory 1503 may exist independently, and is connected to the processor 1501 through the communication bus 1502. Alternatively, the memory 1503 may be integrated with the processor 1501.

The communication interface 1504 is configured to communicate with another device or a communication network by using any apparatus such as a transceiver. The communication interface 1504 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 1501 may include one or more CPUs, for example, a CPU 0 and a CPU 1 shown in FIG. 16.

During specific implementation, in an embodiment, the first network node 1500 may include a plurality of processors, for example, the processor 1501 and a processor 1505 shown in FIG. 16. Each of these processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the first network node 1500 may further include an output device 1506 and an input device 1507. The output device 1506 communicates with the processor 1501, and may display information in a plurality of manners. For example, the output device 1506 may be a liquid crystal display (LCD), a light-emitting diode (LED) display device, a cathode ray tube (CRT) display device, a projector, or the like. The input device 1507 communicates with the processor 1501, and may receive an input from a user in a plurality of manners. For example, the input device 1507 may be a mouse, a keyboard, a touchscreen device, a sensing device, or the like.

In some embodiments, the memory 1503 is configured to store program code 1510 for executing the solutions in this application, and the processor 1501 may execute the program code 1510 stored in the memory 1503. In other words, the first network node 1500 may implement, by using the processor 1501 and the program code 1510 in the memory 1503, the method 400, the method 700, the method 800, the method 1300, or the method 1400 provided in the method embodiments.

The first network node 1500 in this embodiment of this application may correspond to the first network node in the foregoing method embodiments. In addition, the processor 1501, the communication interface 1504, and the like in the first network node 1500 may implement functions of the first network node in the foregoing method embodiments and/or the steps and methods implemented by the first network node. For brevity, details are not described herein again.

It may be understood that the transceiver unit 1410 in the first network node 1400 may be equivalent to the communication interface 1504 in the first network node 1500, and the processing unit 1420 in the first network node 1400 may be equivalent to the processor 1501 in the first network node 1500.

FIG. 17 is a schematic diagram of a structure of a system 1600 according to an embodiment of this application.

As shown in FIG. 17, the system 1600 includes a first network node 1400. Optionally, a hardware structure of the first network node 1400 may be the hardware structure shown in FIG. 16.

An embodiment of this application provides a computer program product. When the computer program product runs on a network device, the network device is enabled to perform the method in the foregoing method embodiments.

An embodiment of this application provides a computer-readable storage medium, configured to store a computer program. The computer program includes a method used to perform the foregoing method embodiments.

An embodiment of this application provides a chip system, including at least one processor and an interface. The at least one processor is configured to invoke and run a computer program, so that the chip system performs the method in the foregoing method embodiments.

The apparatuses in the foregoing product forms separately have any function of the network device in the foregoing method embodiments. Details are not described herein again.

In this application, terms such as "first", "second", and "third" are used to distinguish between same items or similar items that have basically same purposes and functions. It should be understood that there is no logical or time sequence dependency between "first", "second", and "third", and a quantity and an execution sequence are not limited.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, the terms such as "for example" and "such as" are used to represent giving an example, an illustration, or a description. Any embodiment or design scheme described as an "example" in this application should not be explained as being more preferable or having more advantages than another embodiment or design scheme. Exactly, the term "for example" is used to present a concept in a specific manner.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in still some other embodiments" that appear at different places in this specification do not necessarily refer to a same embodiment. Instead, the statements mean "one or more but not all of embodiments", unless otherwise especially emphasized in another manner. The terms "include", "contain", "have", and their variants all mean "include but are not limited to", unless otherwise especially emphasized in another manner.

In this application, the term "at least one" means one or more, and the term "a plurality of" means two or more. The term "and/or" is an association relationship for describing associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of these items, including any combination of singular or plural items (pieces). For example, at least one item (piece) of a, b, or c may indicate: a, b, c, a and b, a and c, b and c, or a, b, and c, where a, b, and c may be singular or plural.

A person of ordinary skill in the art may be aware that in combination with examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art can use different methods to implement the described functions for each particular application, but it should not be considered that the implementation goes beyond the scope of this application.

A person skilled in the art may clearly understand that, for the purpose of convenient and brief description, for a specific work process of the system, apparatus, and unit described above, reference may be made to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separate, and components displayed as units may or may not be physical units, may be located in one position, or may be distributed on a plurality of network units. Some or all of the units may be selected based on actual requirements to achieve the objectives of the solutions in the embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform some or all of the steps of the methods described in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A priority flow control (PFC) storm detection and processing method, wherein the method comprises:

performing, by a first network node, PFC detection on a first port queue of a first port;

determining, by the first network node, that a first preset condition is met, wherein the first preset condition comprises: detection is performed in N consecutive first time segments, when the detection is performed in each first time segment, a quantity of first PFC frames sent by the first port queue to a second network node is greater than a first threshold, and a quantity of one or more data packets received by the first port queue from the second network node is less than a second threshold, wherein the first PFC frame is used to indicate the second network node to suspend sending all data flows in the first port queue, and wherein N is a positive integer; and suspending, by the first network node, the first port queue from sending the first PFC frame to the second network node.

2. The method according to claim 1, wherein the second network node is a source node of a first data flow in the first port queue, the first data flow corresponds to the first PFC frame, duration for which the first network node suspends the first port queue from sending the first PFC frame to the second network node is a second time segment, the second time segment is consecutive to the N consecutive first time segments, the second time segment is a time segment after the N consecutive first time segments, and the following relationship is met:

$$(N \times T_1 + T_2) < (TX\_timeout), \text{ wherein}$$

$N \times T_1$ indicates the N consecutive first time segments, $T_1$ indicates any one of the N first time segments, $T_2$ indicates the second time segment, and Tx_timeout indicates a maximum timeout interval by which the second network node sends a data flow.

3. The method according to claim 1, wherein after suspending the first port queue from sending the first PFC frame to the second network node, the method further comprises:

continuing, by the first port queue of the first network node, to send the first PFC frame to the second network node;

determining, by the first network node, that the first preset condition is met; and disabling, by the first network node, a PFC function of the first port queue.

4. The method according to claim 1, wherein the first network node further comprises a second port and a third port, the second port and the third port are not a same port, the second port is a port connected to the second network node, and the second network node is a destination node of a second data flow; and wherein the method further comprises:

in response to that a second preset condition is met, adjusting, by the first network node, a priority of the second data flow from a first priority to a second priority, wherein before the adjustment, the second data flow flows in from a second port queue of the third port and flows out from a second port queue of the second port, wherein after the adjustment, the second data flow flows in from a third port queue of the third port and flows out from a third port queue of the second port, wherein the third port queue is a port queue corresponding to the second data flow having the second priority, wherein a quantity of PFC frames sent by the third port queue of the third port in a fourth time segment is less than a fourth threshold, and wherein a quantity of PFC frames received by the third port queue of the second port in a third time segment is less than a third threshold.

5. The method of the according to claim 4, wherein second preset condition comprises: a quantity of second PFC frames that are sent by the second network node and that are received by the second port queue of the second port in the third time segment is greater than the third threshold, and a quantity of the second PFC frames that are sent by the second port queue of the third port to a third network node in the fourth time segment is greater than the fourth threshold, wherein the second PFC frame is used to indicate the third network node to suspend sending all data flows in the second port queue of the third port, and wherein the first network node is an intermediate node between the third network node and the second network node.

6. The method according to claim 4, wherein before adjusting the priority of the second data flow, the method further comprises:

performing, by the first network node, PFC detection on the second port queue of the third port, the second port queue of the second port, the third port queue of the third port, and the third port queue of the second port.

7. The method according to claim 4, wherein the method further comprises:

sending, by the first network node, a first notification message to the second network node, wherein the first notification message is used to indicate the second network node to enable a PFC function of a port queue that receives the second data flow having the second priority.

8. The method according to claim 4, wherein the method further comprises:

in response to that a third preset condition is met, adjusting, by the first network node, a priority of the second data flow from the second priority to the first priority, wherein before the adjustment, the second data flow flows in from the third port queue of the third port and flows out from the third port queue of the second port, wherein after the adjustment, the second data flow flows in from the second port queue of the third port and flows out from the second port queue of the second port, wherein the third preset condition comprises: detection is performed in a fifth time segment for M consecutive times, and a PFC frame received by the second port queue of the second port is less than the third threshold in each time of the detection, and wherein M is a positive integer; and sending, by the first network node, a second notification message to the second network node, wherein the second notification message is used to indicate the second network node to disable the PFC function of the port queue that receives the second data flow having the second priority.

9. The method according to claim 1, wherein the first network node is a switch or a router, and wherein the second network node is a server.

10. A first network node, comprising:

at least one processor;

a communication interface; and at least one memory coupled to the at least one processor and storing programming instructions for execution by the at least one processor to perform operations comprising:

performing priority flow control (PFC) detection on a first port queue of a first port;

determining that a first preset condition is met, wherein the preset condition comprises: detection is performed in N consecutive first time segments, when the detection is performed in each first time segment, a quantity of first PFC frames sent by the first port queue to a second network node is greater than a first threshold, and a quantity of one or more data packets received by the first port queue from the second network node is less than a second threshold, wherein the first PFC frame is used to indicate the second network node to suspend sending all data flows in the first port queue, and wherein N is a positive integer; and suspending the first port queue from sending the first PFC frame to the second network node.

11. The first network node according to claim 10, wherein the second network node is a source node of a first data flow in the first port queue, the first data flow corresponds to the first PFC frame, duration for which the first network node suspends the first port queue from sending the first PFC frame to the second network node is a second time segment, the second time segment is consecutive to the N consecutive first time segments, the second time segment is a time segment after the N consecutive first time segments, and the following relationship is met:

$(N \times T_1 + T_2) < (TX\_timeout)$, wherein $N \times T_1$ indicates the N consecutive first time segments, $T_1$ indicates any one of the N first time segments, $T_2$ indicates the second time segment, and Tx_timeout indicates a maximum timeout interval by which the second network node sends a data flow.

12. The first network node according to claim 10, wherein after suspending the first port queue from sending the first PFC frame to the second network node, the operations further comprise:

continuing, by the first port queue of the first network node, to send the first PFC frame to the second network node;

determining that the first preset condition is met; and disabling a PFC function of the first port queue.

13. The first network node according to claim 10, wherein the first network node further comprises a second port and a third port, the second port and the third port are not a same port, the second port is a port connected to the second network node, and the second network node is a destination node of a second data flow; and wherein the operations further comprise:

in response to that a second preset condition is met, adjusting a priority of the second data flow from a first priority to a second priority, wherein before the adjustment, the second data flow flows in from a second port queue of the third port and flows out from a second port queue of the second port, wherein after the adjustment, the second data flow flows in from a third port queue of the third port and flows out from a third port queue of the second port, wherein the third port queue is a port queue corresponding to the second data flow having the second priority, wherein a quantity of PFC frames sent by the third port queue of the third port in a fourth time segment is less than a fourth threshold, and wherein a quantity of PFC frames received by the third port queue of the second port in a third time segment is less than a third threshold.

14. The first network node according to claim 13, wherein the second preset condition comprises: a quantity of second PFC frames that are sent by the second network node and that are received by the second port queue of the second port in the third time segment is greater than the third threshold, and a quantity of the second PFC frames that are sent by the second port queue of the third port to a third network node in the fourth time segment is greater than the fourth threshold, wherein the second PFC frame is used to indicate the third network node to suspend sending all data flows in the second port queue of the third port, and wherein the first network node is an intermediate node between the third network node and the second network node.

15. The first network node according to claim 13, wherein before adjusting the priority of the second data flow, the operations further comprise:

performing PFC detection on the second port queue of the third port, the second port queue of the second port, the third port queue of the third port, and the third port queue of the second port.

16. The first network node according to claim 13, wherein the operations further comprise:

sending a first notification message to the second network node, wherein the first notification message is used to indicate the second network node to enable a PFC function of a port queue that receives the second data flow having the second priority.

17. The first network node according to claim 13, wherein the operations further comprise:

in response to that a third preset condition is met, adjusting a priority of the second data flow from the second priority to the first priority, wherein before the adjustment, the second data flow flows in from the third port queue of the third port and flows out from the third port queue of the second port, wherein after the adjustment, the second data flow flows in from the second port queue of the third port and flows out from the second port queue of the second port, wherein the third preset condition comprises: detection is performed in a fifth time segment for M consecutive times, and a PFC frame received by the second port queue of the second port is less than the third threshold in each time of the detection, and wherein M is a positive integer; and sending a second notification message to the second network node, wherein the second notification message is used to indicate the second network node to disable the PFC function of the port queue that receives the second data flow having the second priority.

18. The first network node according to claim 10, wherein the first network node is a switch or a router, and wherein the second network node is a server.

19. A non-transitory computer-readable storage medium, wherein the non-transitory computer-readable storage medium stores a computer program, and when the computer program runs on one or more processors of a computer, the computer is enabled to perform operations comprising:

performing priority flow control (PFC) detection on a first port queue of a first port;

determining that a first preset condition is met, wherein the first preset condition comprises: detection is performed in N consecutive first time segments, when the detection is performed in each first time segment, a quantity of first PFC frames sent by the first port queue to a second network node is greater than a first threshold, and a quantity of one or more data packets received by the first port queue from the second network node is less than a second threshold, wherein the first PFC frame is used to indicate the second network node to suspend sending all data flows in the first port queue, and wherein N is a positive integer; and suspending the first port queue from sending the first PFC frame to the second network node.

20. The non-transitory computer-readable storage medium according to claim 19, wherein the computer is a switch or a router, and wherein the second network node is a server.

* * * * *